United States Patent
Mitra et al.

(10) Patent No.: US 6,515,263 B2
(45) Date of Patent: Feb. 4, 2003

(54) COOKING STOVE HAVING A SMOOTH-TOP GLASS CERAMIC COOKTOP, AND A SMOOTH-TOP GLASS CERAMIC COOKTOP WITH A GLASS CERAMIC COOKTOP COOKING SURFACE, METHOD FOR PRODUCTION OF STOVES WITH SMOOTH-TOP GLASS CERAMIC COOKTOPS AND SMOOTH-TOP GLASS CERAMIC COOKTOPS

(75) Inventors: Ina Mitra, Stadecken-Elsheim (DE); Friedrich Siebers, Nierstein (DE); Otmar Becker, Langen (DE); Andreas Schminke, Weiterstadt (DE); Bernd Rudinger, Mainz (DE); Christian Roos, Mainz (DE); Evelin Weiss, Mainz (DE); Roland Dudek, Bad Kreuznach (DE); Erich Rodek, Mainz (DE); Friedrich-Georg Schroder, Ingelheim (DE)

(73) Assignee: Schott Glas, Mainz (DE)

( * ) Notice: Subject to any disclaimer, the term of this patent is extended or adjusted under 35 U.S.C. 154(b) by 0 days.

(21) Appl. No.: 09/898,892

(22) Filed: Jul. 3, 2001

(65) Prior Publication Data

US 2002/0026932 A1 Mar. 7, 2002

(30) Foreign Application Priority Data

Jul. 4, 2000 (EP) .............................. 00114268

(51) Int. Cl.[7] .............................. H05B 3/68

(52) U.S. Cl. .................... 219/443.1; 219/548

(58) Field of Search .............. 219/443.1, 452.1, 219/460.1, 546, 547, 548; 428/210, 426, 427, 428; 501/14, 18, 21, 22, 23

(56) References Cited

U.S. PATENT DOCUMENTS

| 3,573,074 A | 3/1971 | Duke et al. |
| 3,886,539 A * | 5/1975 | Gould, Jr. ................ 219/445.1 |

(List continued on next page.)

FOREIGN PATENT DOCUMENTS

| EP | 0220333 | 5/1987 |
| EP | 0437228 | 7/1991 |
| EP | 0536478 | 4/1993 |
| EP | 0711737 | 5/1996 |
| EP | 1029830 | 8/2000 |
| GB | 3345316 | 6/1984 |
| WO | 9906334 | 2/1999 |

OTHER PUBLICATIONS

Nordmann A et al: "Crystallization Behaviour And Microstructural Evolution of LI2O–AL2O3–SIO2 Glass Derived From Spodumene Mineral" Journal of Materials Science, GB, Chapman and Hall Ltd. London, Bd. 32, Nr. 1, 1997, Seiten 83–89.

(List continued on next page.)

*Primary Examiner*—Sang Paik
(74) *Attorney, Agent, or Firm*—Nils H. Ljungman & Associates

(57) ABSTRACT

There is disclosed a stove, with a smooth-top cooktop, for cooking food, the stove comprising: a stove body; a smooth-top cooktop to cook food thereon; and at least one heat source disposed adjacent to a cooking surface of said cooktop. The cooktop comprises glass ceramic with an upper layer and an inner layer, with the upper layer comprising a different glass ceramic material than the inner layer. The upper layer is configured to minimize surface defects such as fissures, cracks, pits, and pores. The inner layer is configured to provide resistance to impact to the upper layer from cooking utensils being dropped onto the upper layer of the smooth-top cooktop, and at least the inner layer of the glass ceramic being configured to obscure visibility of the at least one heat source, through the upper layer of the glass ceramic.

22 Claims, 10 Drawing Sheets

U.S. PATENT DOCUMENTS

| | | | |
|---|---|---|---|
| 3,927,238 A | * 12/1975 | DiMarcello | 428/336 |
| 4,011,091 A | * 3/1977 | McCollister | 501/4 |
| 4,057,670 A | * 11/1977 | Scheidler | 219/460.1 |
| 4,211,820 A | 7/1980 | Cantaloupe et al. | |
| 4,218,512 A | 8/1980 | Allersma | |
| 5,070,045 A | 12/1991 | Comte et al. | |
| 5,173,453 A | 12/1992 | Beall et al. | |
| 5,491,115 A | 2/1996 | Pfitzenmaier et al. | |
| 5,866,239 A | * 2/1999 | Shimatani et al. | 428/210 |
| 6,207,285 B1 | * 3/2001 | Sakoske et al. | 427/508 |

OTHER PUBLICATIONS

Ramos A et al: "Earliest Stages of Crystal Growth in a Silicate Glass Containing Titanium and Zirconium as Nucleating Elements —Hrtem and Xas Study" Journal of Crystal Growth, NL, North–Holland Publishing Co. Amsterdam, Bd. 100, Nr. 3, Mar. 1, 1990 Seiten 471–480, XP000126003.

Database Epodoc Online! European Patent Office, The Hague, NL; Kang Won–Ho (KR): XP002162585 * Zusammenfassung * & KR 9 709 316 B (Kang Won Ho) Jun. 10, 1997.

Scheidler Il et al: "LI2O–AL2O3–SIO2 Glass–Ceramics" American Ceramic Society Bulletin, US, American Ceramic Society. Columbus, Bd. 68, Nr. 11, Nov. 1, 1989, Seiten 1926–1930, XP000126064.

Jewell J M et al: "Effect of Heat–Treatment Temperature on the Properties of a Lithium Aluminosilicate Glass" Journal of the American Ceramic Society, US, American Ceramic Society. Columbus, Bd. 74, Nr. 1, 1991, Seiten 92–97.

* cited by examiner

COOKING STOVE HAVING A SMOOTH-TOP GLASS CERAMIC COOKTOP, AND A SMOOTH-TOP GLASS CERAMIC COOKTOP WITH A GLASS CERAMIC COOKTOP COOKING SURFACE, METHOD FOR PRODUCTION OF STOVES WITH SMOOTH-TOP GLASS CERAMIC COOKTOPS AND SMOOTH-TOP GLASS CERAMIC COOKTOPS

BACKGROUND OF THE INVENTION

1. Field of the Invention

The invention relates to improvements in a cooking stove having a smooth-top glass ceramic cooktop, and a smooth-top glass ceramic cooktop with a glass ceramic cooktop cooking surface, to a method for production of stoves with smooth-top glass ceramic cooktops and smooth-top glass ceramic cooktops.

2. Background Information

Smooth-top glass ceramic cooktop cooking surfaces of smooth-top kitchen ceramic or glass ceramic cooktops or a stove having a ceramic or glass ceramic cooktop cooking surface have gained considerable popularity as kitchen appliances.

Thus, cooking appliances having ceramic or glass ceramic cooking surfaces are known.

They provide a substantially smooth upper surface on which the various utensils that are to be heated can be disposed.

In these appliances, the cooking zones can be heated, as a rule, by means of electrically operated or gas operated heating devices arranged below the ceramic or glass ceramic cooking surface in the region of the cooking zones. These devices can be, for example, electrically operated contact-heating or radiant heating elements or else gas-jet burners.

An example of a cooktop comprises an induction heating apparatus having a cooktop including a plurality of induction surface heating units. The cooktop comprises a horizontally disposed planar metal support surface having a plurality of openings therein. A ceramic smooth-top plate is supported in each of the openings and adapted to support a cooking utensil thereon. An induction heating coil is supported subjacent to the ceramic plate in a position to generate a magnetic field which passes through the plate to link the cooking utensil. Each plate is supported by a metallic trim frame, which abuts a conductive layer on the plate, with the frame and layer combining to provide a low reluctance flux path, the low reluctance path operating to reduce the magnetic flux leaked into the space surrounding the heating apparatus during operation thereof.

Another example of a cooktop has a heating unit that includes two tubular tungsten-halogen lamps, each having a tungsten filament. The lamps are supported within a ring of ceramic fibre material and the unit is preferably mounted beneath an infra-red-transmissive cooktop to define a hot-plate area of a cooking hob. A control circuit provides a range of discrete power outputs of the lamps, each power output corresponding to a power control setting set by a user of the cooking hob. The circuit includes a phase control circuit for switching power to the lamps at a predetermined phase angle to achieve one or more of the lower power outputs.

Yet another example of a cooktop comprises a burner for a "sealed top" range which has a generally upwardly diverging conical body with radially disposed fuel ports and a generally flat removable cap disposed on the upper periphery of the body this invention is a translucent glass ceramic, a method for its production and its use.

Furthermore, it is known that glass made from the system lithium oxide-aluminium oxide-silicon dioxide can be transformed into glass ceramics (LAS glass ceramics) with high quartz mixed crystals and/or keatite mixed crystals as the main crystal phases. These glass ceramics are manufactured in a number of different stages. After the fusion and hot forming, the material is conventionally cooled to below the inversion temperature. In other words, the material may be cooled to below the transformation temperature. The initial glass is then transformed by controlled crystallization into a glass ceramic item. This ceramization takes place in a multiple-stage temperature process, in which first by nucleation at a temperature between approximately six hundred degrees Celsius to eight hundred degrees Celsius nuclei or seeds, generally consisting of titanium dioxide or zirconium dioxide/titanium dioxide mixed crystals, are generated, although tin dioxide can also participate in the nucleation. During the subsequent temperature increase, at the crystallization temperature of approximately seven hundred and fifty degrees Celsius to nine hundred degrees Celsius, first high quartz mixed crystals form on these nuclei. As the temperature is increased further in the range of approximately nine hundred degrees Celsius to twelve hundred degrees Celsius, these high quartz mixed crystals are further transformed into keatite mixed crystals. The transformation into keatite mixed crystals is accompanied by a crystal growth, i.e. increasing crystallite size, as a result of which there is an increasing diffraction of light, i.e. the light transmission becomes less and less. The glass ceramic item thereby appears increasingly translucent and finally opaque. The glass ceramics with high quartz mixed crystals are usually transparent, and translucent glass ceramics can also be manufactured by reducing the concentration of nucleation agents.

A key characteristic of these glass ceramics is that they are manufactured with materials that have an extremely low coefficient of thermal expansion in the range from room temperature up to approximately seven hundred degrees Celsius of less than one and five tenths millionths per degree Kelvin. With glass ceramics that contain high quartz mixed crystals as the main crystal phase, even materials with almost zero expansion can be realized in a specified temperature range, e.g. between room temperature and seven hundred degrees Celsius.

These glass ceramics are used in transparent form, for example, as fire protection glass, smokestack view windows or cookware. For use as a cooking surface, it is desirable to reduce the light transmission, to make it impossible to see through the surface to the equipment installed underneath. This reduction of light transmission can be achieved, for example, by coloring transparent glass ceramics as well as by using translucent or opaque transformed glass ceramics.

For example, WO 99/06334 describes a translucent glass ceramic of the prior art which has a degree of opacity of at least fifty-percent. WO 99/06334 also claims a corresponding translucent glass ceramic with a transmission in the visible range of five percent to forty percent. The above mentioned translucent glass ceramics thereby contain either beta-spodumene (keatite mixed crystals) as the predominant crystal phase or exclusively beta-spodumene as the only crystal phase.

European Patent 0 437 228 A1 (corresponding to U.S. Pat. No. 5,070,045 issued to Comte et al. on Dec. 3, 1991 and entitled, "Transparent glass-ceramic article,") describes a transparent glass ceramic with beta-quartz mixed crystals (high quartz mixed crystals) as the predominant crystal phase or a white opaque glass ceramic with beta-spodumene mixed crystals (keatite mixed crystals) as the predominant crystal phase.

The variable-translucence glass ceramic described in European Patent 536 478 A1 (corresponding to U.S. Pat. No. 5,173,453 issued to Beall et al. on Dec. 22, 1992 and entitled, "Variably translucent glass-ceramic article and method for making,") contains, in addition to areas with beta-quartz mixed crystals, areas with beta-spodumene/gahnite mixed crystals. These gahnite mixed crystals (zinc oxide-aluminum oxide) are formed during the phase transformation of beta-quartz mixed crystals into beta-spodumene mixed crystals and compensate for the change in density that accompanies this phase transformation. The immediate vicinity of transparent, translucent and opaque areas can therefore be transformed in a glass ceramic item. In the translucent and opaque areas, keatite mixed crystals are the main crystal phase. Gahnite crystals have a significantly higher coefficient of thermal expansion than the above mentioned mixed crystal phases (high quartz or keatite) of typical LAS glass ceramics. It can be expected that a variably crystallized product of this type has disadvantages in its impact strength and will develop structural cracks fairly early in actual use on account of the different expansion characteristics.

U.S. Pat. No. 4,211,820 issued to Cantaloupe et al. on Jul. 8, 1980 and entitled, "Brown glass-ceramic articles," describes essentially transparent glass ceramics with slight opacity, with beta-spodumene mixed crystals as the predominant crystal phase in the interior of the glass ceramic. By means of two hundredths weight percent to two tenths weight percent of vanadium pentoxide, the transparent glass ceramics claimed there are tinted brown. A comparable glass ceramic is described in U.S. Pat. No. 4,218,512 issued to Allersma on August 1980 and entitled, "Strengthened translucent glass-ceramics and method of making".

OBJECT OF THE INVENTION

One object of the invention is to provide a smooth smooth-top cooktop glass ceramic comprising at least one of: (a) an upper layer of said glass ceramic being configured to minimize surface defects; said surface defects comprising at least one of: fissures, cracks, pits, and pores; (b) an inner layer of said glass ceramic being configured to provide resistance to impact to said upper layer from cooking utensils being dropped onto said upper layer of said smooth-top cooktop; and (c) at least said inner layer of said glass ceramic being configured to obscure visibility, through said upper layer of said glass ceramic, of said at least one heat source.

Another object of the invention is to find a translucent glass ceramic and a method for the manufacture of a translucent glass ceramic, whereby the glass ceramic has a light transmission in the visible range of five tenths percent to ten percent at a specimen thickness of four millimeters, an impact strength of more than eighteen centimeters drop ball impact strength on average, tested with a two hundred grams steel ball in the ball drop impact strength test, and can withstand high temperature differences of more than six hundred and fifty degrees Celsius.

SUMMARY OF THE INVENTION

In accordance with one aspect the invention teaches that these and other objects can be accomplished by a stove, with a smooth-top cooktop, for cooking food, said stove comprising: a stove body; said stove body being configured with a support comprising feet; a smooth-top cooktop to cook food thereon; an arrangement to attach said smooth-top cooktop to said stove body; said smooth-top cooktop comprising a layer which becomes an upper layer upon installation in a kitchen; said smooth-top cooktop comprising a cooking surface configured to cook food; said cooking surface being disposed at or adjacent to said upper layer of said smooth-top cooktop; said cooking surface, at or adjacent to said upper layer of said smooth-top cooktop, being configured to receive a bottom of a cooking vessel to cook food therein; at least one heat source; said at least one heat source being configured to heat said cooking surface to thereby cook food; said at least one heat source being disposed adjacent to said cooking surface; control apparatus being configured and disposed to control said smooth-top cooktop; said control apparatus being connected to control said at least one heat source and thus to control heat; said smooth-top cooktop comprising glass ceramic; said cooking surface being disposed adjacent to or comprising a part of said glass ceramic; said glass ceramic comprising said upper layer and an inner layer contiguous to said upper layer; said inner layer of said glass ceramic being disposed below said upper layer of said glass ceramic upon installation of said stove in a kitchen; said upper layer and said contiguous inner layer of said glass ceramic comprising a glass ceramic structure being continuously glass ceramic from said upper layer through said inner layer; said upper layer comprising a first glass ceramic material; said inner layer comprising a second glass ceramic material; said first glass ceramic material comprising a different glass ceramic material than said second glass ceramic material; said upper layer of said glass ceramic being configured to minimize surface defects; said surface defects comprising at least one of: fissures, cracks, pits, and pores; said inner layer of said glass ceramic being configured to provide resistance to impact to said upper layer from cooking utensils being dropped onto said upper layer of said smooth-top cooktop; and at least said inner layer of said glass ceramic being configured to obscure visibility, through said upper layer of said glass ceramic, of said at least one heat source.

The invention also teaches that the object can be accomplished by a glass ceramic comprising a light transmission or, in other words, a light transmissivity, in the visible range of five tenths percent to ten percent with four millimeters specimen thickness, an impact strength of more than eighteen centimeters drop ball impact strength on average, tested with a two hundred grams steel ball in the ball drop test, an ability to withstand temperature differences of more than six hundred and fifty degrees Celsius, keatite mixed crystals as the predominant crystal phase in the surface layer of the glass ceramic, high quartz mixed crystals as an additional crystal phase in the surface layer of the glass ceramic, a coefficient of thermal expansion of the high quartz mixed crystals which is less than that of the keatite mixed crystals, so that a surface condition of the glass-ceramic is achieved that counteracts the origin of superficial injuries that reduce strength, and a silicon dioxide content of the high quartz mixed crystals that is less than eighty weight percent, so that as the glass ceramic cools to room temperature, the transformation of the high quartz mixed crystals phase into an undesirable low quartz mixed crystals phase, which leads to cracks in the surface of the glass ceramic, is prevented.

The invention also teaches a method for the production of a translucent, essentially plate-shaped glass ceramic with a light transmission in the visible range of five tenths percent to ten percent with four millimeters specimen thickness, an impact strength of more than eighteen centimeters drop ball impact strength on average, tested with a two hundred grams steel ball in the ball drop test, an ability to withstand temperature differences of more than six hundred and fifty degrees Celsius, keatite mixed crystals as the predominant crystal phase in the surface layer of the glass ceramic, high quartz mixed crystals as an additional crystal phase in the surface layer of the glass ceramic, a coefficient of thermal expansion of the high quartz mixed crystals which is less than that of the keatite mixed crystals, so that a surface condition of the glass ceramic is achieved that counteracts the origin of superficial injuries that reduce strength, a silicon dioxide content of the high quartz mixed crystals that is less than eighty weight percent, so that as the glass ceramic cools to room temperature, the transformation of the high quartz mixed crystals phase into an undesirable low quartz mixed crystals phase, which leads to cracks in the surface of the glass ceramic, is prevented, whereby the laminated structure with keatite mixed crystals as the predominant crystal phase in the interior of the glass ceramic and high quartz mixed crystals as the predominant crystal phase in the surface layer of the glass ceramic is produced by the fact that the temperature range of the nucleation of nucleus crystals containing zirconium/titanium from six hundred and fifty degrees Celsius to seven hundred and sixty degrees Celsius is traversed at high heating rates of more than seven degrees Kelvin per minute, the crystallization of the high quartz mixed crystal phase is performed at a temperature from seven hundred and sixty degrees Celsius to eight hundred and fifty degrees Celsius, and the hold time in the temperature range between six hundred and fifty degrees Celsius to eight hundred and fifty degrees Celsius is less than sixty minutes.

The translucent glass ceramic taught by the invention thereby has:

a light transmission in the visible range from five tenths percent to ten percent at a specimen thickness of four millimeters, an impact strength of more than eighteen centimeters drop ball impact strength on average, tested with a two hundred grams steel ball in the falling ball impact test, the ability to withstand a temperature difference of more than six hundred and fifty degrees Celsius, preferably greater than seven hundred degrees Celsius, keatite mixed crystals as the predominant crystal phase in the interior of the glass ceramic, high quartz mixed crystals as an additional crystal phase in the surface layer of the glass ceramic, a coefficient of thermal expansion of the high quartz mixed crystals that is less than that of the keatite mixed crystals, so that a surface condition of the glass ceramic is produced that counteracts the origin of surface damage that reduces the strength of the glass ceramic, and a silicon dioxide content of the high quartz mixed crystals that is less than eighty weight percent, so that as the glass ceramic cools to room temperature, the transformation of the high quartz mixed crystal phase to an undesirable low quartz mixed crystal phase, which leads to cracks in the surface of the glass ceramic, is prevented.

In a method taught by the invention for the manufacture of a translucent glass ceramic with a light transmission or, in other words, light transmissivity, in the visible range from five tenths percent to ten percent at a specimen thickness of four millimeters, an impact strength of more than eighteen centimeters cm drop ball impact strength on average tested with a two hundred grams steel ball in the ball drop impact strength test, the ability to withstand a temperature difference of more than six hundred and fifty degrees Celsius, preferably greater than seven hundred degrees Celsius, with keatite mixed crystals as the predominant crystal phase in the interior of the glass ceramic, with high quartz mixed crystals as the crystal phase in the surface layer of the glass ceramic, a coefficient of thermal expansion of the high quartz mixed crystals that is less than that of the keatite mixed crystals, so that a surface condition of the glass ceramic is produced which counteracts the origin of surface damage that reduces the strength of the glass ceramic, a silicon dioxide content of the high quartz mixed crystals which is greater than eighty weight percent, so that as the glass ceramic cools to room temperature, the transformation of the high quartz mixed crystal phase to an undesirable low quartz mixed crystal phase, which leads to cracks in the surface of the glass ceramic, is prevented, the lamination with keatite mixed crystals as the predominant crystal phase in the interior of the glass ceramic and high quartz mixed crystals as an additional crystal phase in the surface layer of the glass ceramic, because the temperature range of six hundred and fifty degrees Celsius to seven hundred and sixty degrees Celsius of the nucleation of seed crystals or crystal nuclei that contain zirconium/titanium is traversed at high heating rates of more than seven degrees Kelvin per minute, the crystallization of the high quartz mixed crystal phase is performed at a temperature from seven hundred and sixty degrees Celsius to eight hundred and fifty degrees Celsius, and the hold time in the temperature range between six hundred and fifty degrees Celsius and eight hundred and fifty degrees Celsius is less than sixty minutes.

During the crystallization of the high quartz mixed crystal phase in the temperature range from seven hundred and sixty degrees Celsius to eight hundred and fifty degrees Celsius, the glass ceramic can be held at a defined temperature, although it is also possible to traverse at least something of a temperature range. In other words, the mentioned temperature range can be traversed at least in part.

The glass ceramic taught by the invention or the glass ceramic manufactured by the method taught by the invention preferably has high quartz mixed crystals as the predominant crystal phase in the surface layer of the glass ceramic.

The ability of the glass ceramic to withstand temperature differences is indicated by the following expression: delta T is equal to the result of the division comprising the numerator of sigma g times one minus mu and the denominator alpha times E, where delta T is the ability to withstand temperature differences, mu is the Poisson ratio, E is the modulus of elasticity, alpha is the coefficient of thermal expansion and sigma g is the strength that must be used for the value that is set in practical use as a result of surface damage.

Because the thermal expansion of the high quartz mixed crystals is less than that of the keatite mixed crystals, so that a surface condition of the glass ceramic is achieved that counteracts the origin of surface injuries that would reduce the strength of the glass ceramic, there is reason to suspect that a compression stress is generated on the surface of the glass ceramic that counteracts both external tensile stresses caused by impact loads as well as the generation of surface damage that would reduce the strength of the glass ceramic in practical use. As a result, the level of strength after the type of damage suffered in normal use is higher. This effect is also known with compression stresses that are produced by chemical prestressing, e.g. by the replacement of potassium with sodium in glass. Chemical prestressing, however, cannot be used on cooking surfaces, because the compression stresses are then reduced again by the high temperatures in the cooking zones.

To achieve the ability to withstand high temperature differences, essentially the strength after the sort of damage suffered in actual practice sigma g should be high and the coefficient of thermal expansion alpha should be low. The modulus of elasticity and the Poisson ratio can be influenced only to a small extent by the composition and the manufacturing process. For example, it is advantageous if the thermal expansion of the glass ceramic between room temperature and seven hundred degrees Celsius is less than one and three tenths millionths per degree Kelvin, and preferably less than one and one tenth millionths per degree Kelvin.

Simulation calculations of a plate-shaped cooking surface made of the translucent glass ceramic claimed by the invention using finite element methods show that when the cooking zones are operated correctly, tangential tensile stresses occur on the outer edge of the plate. With the transformation method taught by the invention, a surface condition is produced on the outer edge of the plate which, even after damage suffered during normal wear, has a high strength sigma g. That means that the ability to withstand temperature differences is sufficiently high for the glass ceramic to be used as a cooking surface.

To protect the glass ceramic from the effects of acid on the high quartz mixed crystals, it is advantageous if a vitreous layer approximately one hundred nanometers to six hundred nanometers thick is produced on the immediate surface above the high quartz mixed crystals. In this vitreous layer, the components that are not incorporated into the high quartz mixed crystals, e.g. alkali oxides such as sodium oxide, potassium oxide and earth alkali oxides such as calcium oxide, strontium oxide and barium oxide are enriched. To produce the protective vitreous layer, therefore the above mentioned alkali and earth alkali oxides should be ingredients in the composition. It is known that high quartz mixed crystals can be destroyed by the effects of acid, as a result of which the lithium is replaced by protons from the acid. With the destruction of the high quartz mixed crystals in the layer close to the surface, their positive influence on the ability to withstand temperature differences is also lost.

The laminated structure described above with a vitreous layer that is approximately one hundred nanometers to six hundred nanometers thick, a layer near the surface with high quartz mixed crystals and the keatite mixed crystals in the interior of the glass ceramic can be produced during the ceramization of the glass ceramic by running through the temperature range of the nucleation of seed crystals containing zirconium/titanium from six hundred and fifty degrees Celsius to seven hundred and sixty degrees Celsius at high heating rates of more than seven degrees Kelvin per minute, and the crystallization of the high quartz mixed crystal phase is performed at a temperature of approximately seven hundred and sixty degrees Celsius to eight hundred and fifty degrees Celsius. On plate-shaped glass, it has been found to be advantageous to avoid uneven spots caused by uneven crystallization in the plate if the heating rate is slowed down between seven hundred and sixty degrees Celsius to eight hundred and fifty degrees Celsius or a hold time, or, in other words, a residence time, is introduced. Overall, the hold time in the temperature range between six hundred and fifty degrees Celsius to eight hundred and fifty degrees Celsius should be less than sixty minutes, otherwise a worsening of the ability to withstand temperature differences is observed.

The temperature maximum of the manufacturing process is at temperatures from one thousand degrees Celsius to eleven hundred degrees Celsius. This is where the transformation into the translucent glass ceramic taught by the invention with a light transmission of five tenths percent to ten percent with a four millimeters specimen thickness occurs. The heating-rates and the hold time at the maximum temperature must be selected so that on one hand the desired translucence is achieved, i.e. light transmission of five tenths percent to ten percent at four millimeters specimen thickness. On the other hand, the hold time should not be extended to the point where the high quartz mixed crystal phase has undesirably high silicon dioxide levels in the surface. Silicon dioxide levels on the order of magnitude of greater than eighty percent can result in a transformation from the high quartz structure to a low quartz structure during cooling. It has been observed that the composition of the high quartz mixed crystals varies with the hold time. As the hold time increases, the high quartz mixed crystal phase becomes increasingly richer in silicon dioxide, so that the hold time at the maximum temperature must be limited by process control measures. The allowable hold time depends on the composition of the glass ceramic, the heating rate and the level of the maximum temperature.

Thin-film X-ray diffraction is used to determine the allowable hold, or, in other words, residence, time for the specific process with a given maximum temperature and heating rate. The crystal quartz phase in the surface is measured by measuring with a grazing incidence angle of approximately six tenths degrees. The principal reflections of the crystal quartz phase are at two-theta values of twenty and five tenths degrees and twenty-six degrees. From the diffraction diagrams, the a-lattice constant of the respective crystal quartz phase can be determined. The a-lattice constant of the elementary cell reflects the silicon dioxide content of the quartz phase. Low a-lattice constants stand for high silicon dioxide contents. For each glass ceramic composition, a limit value for the a-lattice constant can be determined at which, on account of high silicon dioxide contents of greater than eighty percent in the quartz phase during cooling, the undesired transformation into the low quartz structure occurs. The limit values for the a-lattice constant are on the order of magnitude of five angstroms to five and four hundredths angstroms.

The transformation of the high quartz mixed crystals into the low quartz structure must be avoided at all costs, because it results in a volume contraction, and on account of the high coefficient of thermal expansion of low quartz compared with the keatite mixed crystal phase in the interior of the glass ceramic, it leads to high stresses in the surface. As a result of the high tensile stresses, surface cracks appear in the glass ceramic item which drastically reduce the impact strength below the required level. The prevention of surface cracks is decisive to achieve the required high impact strengths of eighteen centimeters on average, tested with a two hundred grams steel ball in the drop ball impact test based on DIN 52306. The transformation of the high quartz mixed crystals into the low quartz structure can be reliably determined by the microscopically detectable surface cracks and the related reduction in impact strength. Using this method it is possible to empirically determine the allowable hold time at the specified maximum temperature and heating rate. FIG. 4 shows, for a given composition (Glass No. 1 in Table 1), how the surface cracks occur as a consequence of excessive hold times at a specified heating rate. For each glass ceramic composition, the respective limit value for the a-lattice constant measured with thin-film X-ray diffraction can also be determined. This procedure is illustrated in FIG. 5 for the probes that are identical to those illustrated in FIG. 4. In this example, the critical silicon dioxide content for the undesirable transformation of the high quartz mixed crystals into the low quartz structure lies at values of the lattice constant of a less than approximately five and two hundredths angstroms.

To achieve a the ability to withstand large temperature differences, it has been found to be advantageous if the average grain size of the keatite mixed crystals in the interior of the glass ceramic is three tenths micrometers to two micrometers and preferably one micrometer to one and five tenths micrometers. The upper limit results from the fact that with larger average grain sizes, i.e. a coarse structure, undesirably high microstresses result. The average grain size should be not less than three tenths micrometers and preferably not less than one micrometer, because otherwise the propagation of cracks geometrically is not sufficiently prevented. In the range of medium grain sizes of three tenths micrometers to two micrometers, a high strength with normal practical damage sigma g is achieved by the known phenomenon of crack ramification.

A glass ceramic taught by the invention is preferably characterized by a composition in weight percent on an oxide basis of lithium oxide comprising three and zero percent to four percent, sodium monoxide comprising zero percent to one and zero percent, potassium monoxide comprising zero percent to six tenths percent, with the sum of sodium monoxide plus potassium monoxide comprising two tenths percent to one percent, magnesium oxide comprising zero percent to one and five tenths percent, calcium oxide comprising zero percent to five tenths percent, strontium oxide comprising zero percent to one percent, barium oxide comprising zero percent to two and five tenths percent, with the sum of calcium oxide plus strontium oxide plus barium oxide comprising two tenths percent to three percent, zinc oxide comprising one percent to two and two tenths percent, aluminium oxide comprising more than nineteen and eight tenths percent to twenty-three percent, silicon dioxide comprising sixty-six percent to seventy percent, titanium dioxide comprising two percent to three percent, zirconium dioxide comprising five tenths percent to two percent, and phosphoric oxide comprising zero percent to one percent.

A glass ceramic also taught by the invention is preferably characterized by a composition in weight percent on an oxide basis of: lithium oxide comprising three percent to four percent and within the range percentages in tenth of percent steps such that any tenth of a percent may be a limit of a diminished range, sodium monoxide comprising zero percent to one percent and within the range percentages in tenth of percent steps such that any tenth of a percent may be a limit of a diminished range, potassium monoxide comprising zero percent to six tenths percent and within the range percentages in tenth of percent steps such that any tenth of a percent may be a limit of a diminished range, with the sum of sodium monoxide plus potassium monoxide comprising two tenths percent to one percent and within the range percentages in tenth of percent steps such that any tenth of a percent may be a limit of a diminished range, magnesium oxide comprising zero percent to one and five tenths percent and within the range percentages in tenth of percent steps such that any tenth of a percent may be a limit of a diminished range, calcium oxide comprising zero percent to five tenths percent and within the range percentages in tenth of percent steps such that any tenth of a percent may be a limit of a diminished range, strontium oxide comprising zero percent to one percent and within the range percentages in tenth of percent steps such that any tenth of a percent may be a limit of a diminished range, barium oxide comprising zero percent to two and five tenths percent and within the range percentages in tenth of percent steps such that any tenth of a percent may be a limit of a diminished range, with the sum of calcium oxide plus strontium oxide plus barium oxide comprising two tenths percent to three percent and within the range percentages in tenth of percent steps such that any tenth of a percent may be a limit of a diminished range, zinc oxide comprising one percent to two and two tenths percent and within the range percentages in tenth of percent steps such that any tenth of a percent may be a limit of a diminished range, aluminum oxide comprising more than nineteen and eight tenths percent to twenty-three percent and within the range percentages in tenth of percent steps such that any tenth of a percent may be a limit of a diminished range, silicon dioxide comprising sixty-six percent to seventy percent and within the range percentages in tenth of percent steps such that any tenth of a percent may be a limit of a diminished range, titanium dioxide comprising two percent to three percent and within the range percentages in tenth of percent steps such that any tenth of a percent may be a limit of a diminished range, zirconium dioxide comprising five tenths percent to two percent and within the range percentages in tenth of percent steps such that any tenth of a percent may be a limit of a diminished range, and phosphoric oxide comprising zero percent to one percent and within the range percentages in tenth of percent steps such that any tenth of a percent may be a limit of a diminished range.

For the realization of the structure of the translucent glass ceramic claimed by the invention, lithium oxide, zinc oxide, aluminum oxide and silicon dioxide are necessary in the indicated limits. These components are ingredients of the high quartz and keatite mixed crystals. The relatively narrow ranges are necessary so that the desired structure is formed. The aluminum oxide content should be greater than nineteen and eight tenths weight percent, because otherwise undesirably high silicon dioxide contents in the high quartz mixed crystals near the surface are favored. The aluminium oxide content is less than twenty-three weight percent because high aluminum oxide contents can lead to the undesirable devitrification of mullite when the molten glass is being molded. Magnesium oxide and phosphoric oxide can be incorporated as additional components. The addition of the alkalis sodium monoxide and potassium monoxide and the earth alkalis calcium oxide, strontium oxide and barium oxide improve the fusibility and the devitrification behavior of the glass during manufacture. The content levels are limited because these components essentially remain in the residual glass phase of the glass ceramic, and excessive levels undesirably increase the thermal expansion. The indicated minimum totals for the alkalis and earth alkalis are necessary so that the structure taught by the invention can be realized. The titanium dioxide content is between two weight percent and three weight percent, the zirconium dioxide content is between five tenths weight percent and two weight percent. Both are essential as nucleation agents. The translucent glass ceramic can be produced during the manufacturing process by the addition of conventional fining agents such as arsenic pentasulfide, antimony trioxide, tin dioxide, ceric oxide, sulfate and chloride compounds.

The translucent glass ceramic claimed by the invention can be manufactured in a variety of colors in accordance with the needs and desires of the market. If a high white value in the LAB System of L* greater than eighty-three is desired, the content of coloring impurities, in this case especially vanadium pentoxide, molybdenum trioxide, cobalt oxide and nickel oxide must be kept to extremely low levels. For example, vanadium pentoxide should be less than fifteen parts per million, molybdenum trioxide less than twenty parts per million, cobalt oxide less than ten parts per million, nickel oxide less than ten parts per million and the sum of the above mentioned color oxides should be less than thirty parts per million. On the other hand, if certain tints of the white color are desired, the conventional coloring components such as, for example, vanadium, chromium, manganese, cerium, iron, cobalt, copper, nickel, selenium and chlorine compounds can be used to achieve defined colors in the LAB system. To achieve a beige shade, for example, the addition of ceric oxide, manganese dioxide, iron oxide individually or in combination has proven successful.

For economic reasons it is advantageous if, from the same composition, in addition to the translucent glass ceramic, it is also possible to manufacture an opaque glass ceramic with light transmission less than five tenths percent at a specimen thickness of four millimeters. In this case, it is advantageous to perform the transformation into an opaque glass ceramic with keatite mixed crystal at elevated temperatures, because the resulting high quartz mixed crystals near the surface can thereby be decreased and the problem of the low quartz phase transition in high quartz mixed crystals that are high in silicon dioxide, which accompanies extended hold times, can be bypassed. An additional embodiment can be realized in the form of the opaque glass ceramics.

It is further economically advantageous if a transparent glass ceramic with high quartz mixed crystals as the predominant crystal phase and a transmission or, in other words, light transmissivity, of greater than eighty percent at a four millimeters specimen thickness can also be manufactured from the same composition from which the translucent glass ceramic is manufactured. This is possible if, after the crystallization of the high quartz mixed crystal, there is no temperature increase for the transformation into a translucent glass ceramic that contains keatite mixed crystals.

Preferably, a glass ceramic as claimed by the invention or a glass ceramic manufactured using the method taught by the invention is used in translucent or opaque form as a cooking surface or as cookware and in transparent form as fire protection glass, smokestack view windows, cookware or windows for combustion furnaces.

The white value and color in the LAB color system were measured using a measurement instrument against a black background.

The test of the ability of the glass ceramic plates claimed by the invention to withstand large temperature differences is performed on the basis of a typical stress situation when the glass ceramic plate is used as a cooking surface. A section of the glass ceramic plate to be tested, large enough for the test (generally a square section having the dimensions two hundred and fifty millimeters by two hundred and fifty millimeters) was mounted horizontally. The underside of the glass ceramic plate was heated by means of a conventional circular radiant heater, of the type conventionally used on cooktops, whereby any temperature limiting devices that were present were deactivated. The upper side of the glass ceramic plate was shielded by a metal hood from external factors that might interfere with the measurement process. Also on the upper side, the temperature of the glass ceramic plate, which increased gradually during the heating process, was measured, and specifically at the hottest spot within the uneven surface temperature distribution which is typical of the heating systems used. The area of the plate edge to be tested in terms of its ability to withstand temperature differences thereby has an unheated minimum width—measured as the minimum distance between the outer edge of the plate and the inner boundary of the lateral insulated edge of the radiant heater—corresponding to the most critical positioning of the heaters on cooktops. During the heating process, the unheated outer area came under tangential tensile stresses. The temperature at the measurement position described above at which the glass ceramic plate breaks under the action of the tangential tensile stresses was used as a reference value for the ability of the glass ceramic to withstand temperature differences.

The impact strength was measured using the ball drop test based on DIN 52306. The measurement specimen was a square section (dimensions one hundred millimeter by one hundred millimeters) of the glass ceramic panel to be tested and was mounted in a test frame. A two hundred grams steel ball was allowed to fall on the center of the specimen. The height of the drop was increased in steps until the glass ceramic panel broke. On account of the statistical character of the impact strength, this test was performed on a series of approximately ten specimens and the average of the ball drop heights measured was determined.

The above-discussed embodiments of the present invention will be described further hereinbelow. When the word "invention" is used in this specification, the word "invention" includes "inventions", that is the plural of "invention". By stating "invention", the Applicants do not in any way admit that the present application does not include more than one patentably and non-obviously distinct invention, and maintain that this application may include more than one patentably and non-obviously distinct invention. The Applicants hereby assert that the disclosure of this application may include more than one invention, and, in the event that there is more than one invention, that these inventions may be patentable and non-obvious one with respect to the other.

BRIEF DESCRIPTION OF THE DRAWINGS

The invention is explained in greater detail below with reference to the embodiments which are illustrated in the accompanying drawings.

DESCRIPTION OF THE PREFERRED EMBODIMENT

The invention is explained in greater detail below with reference to the following embodiments and examples.

Figure 1:
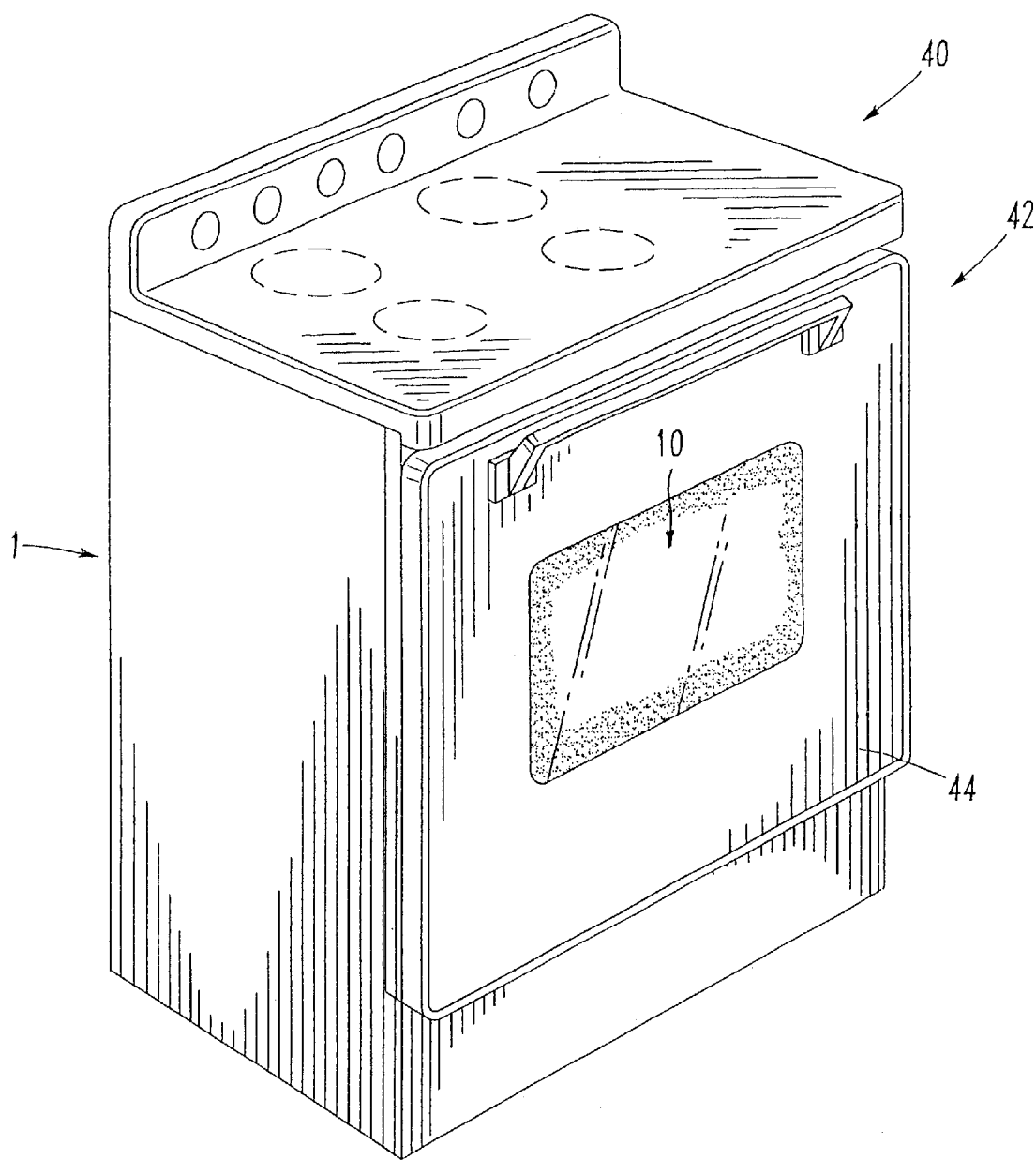
FIG. 1: is a perspective view of a stove with a cooktop and oven.

FIG. 1 of the embodiment example shows a stove 1 for cooking food with a cooktop 40 and an oven 42. The oven door 44 has a window 10. Both the cooktop 40 and the window 10 of the oven door 42 can have easy-to-clean glass ceramic surfaces according to the invention.

Figure 2:
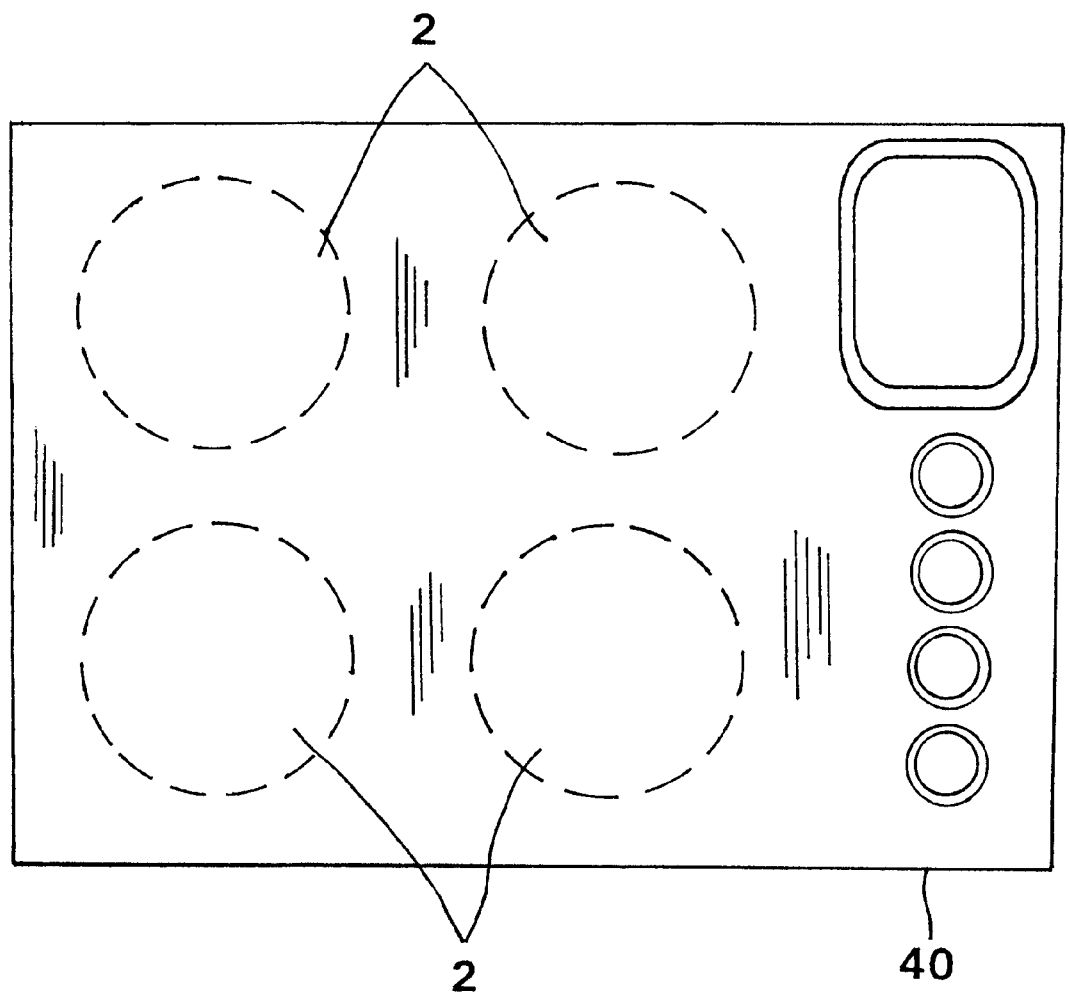
FIG. 2: is a top view of a cooktop or hob with multiple cooking zones.

FIG. 2 illustrates a cooktop or hob for cooking food 40 with cooking zones 2. The cooktop 40 has an easy-to-clean glass ceramic surface.

Figure 3:
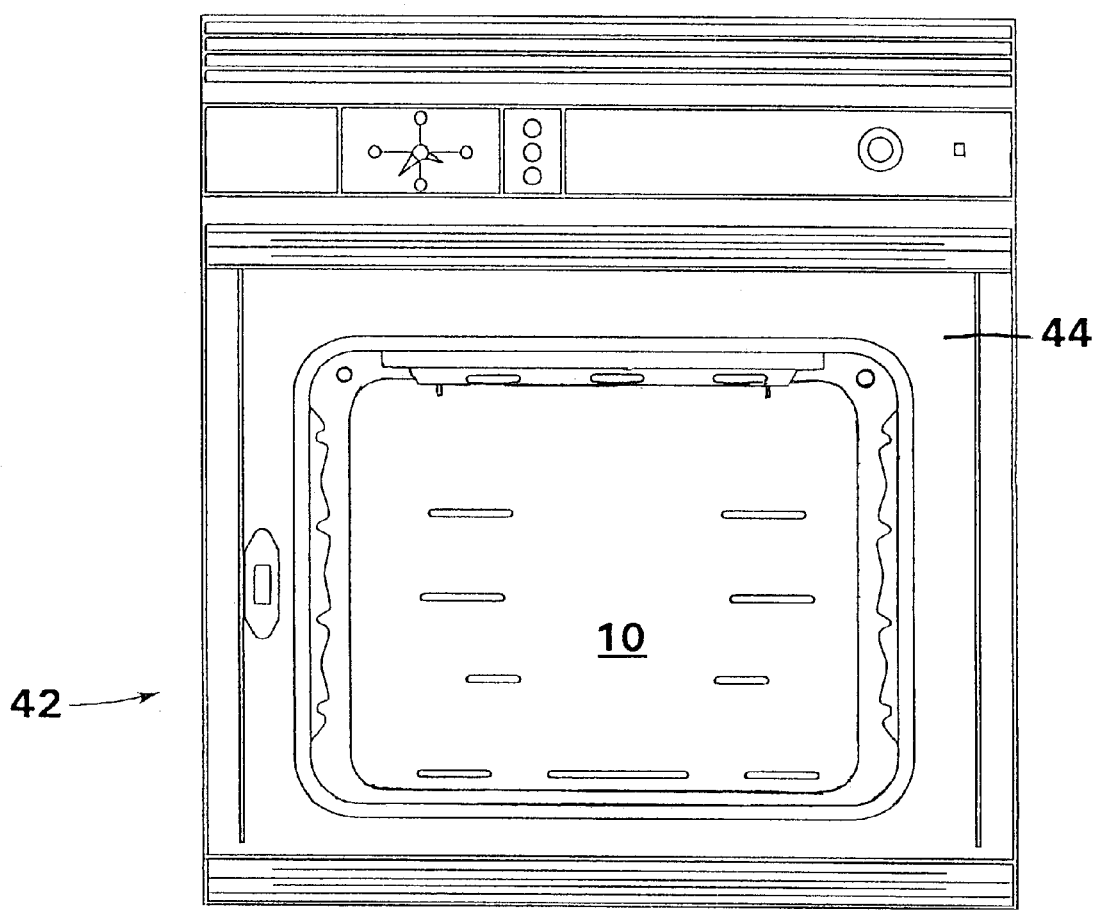
FIG. 3: is a front elevational view of a free-standing oven with an oven door window.

FIG. 3 shows a free-standing oven for cooking food 42 with an oven door 44. The oven door 44 has a window 10 with an easy-to-clean glass ceramic surface.

Figure 4:
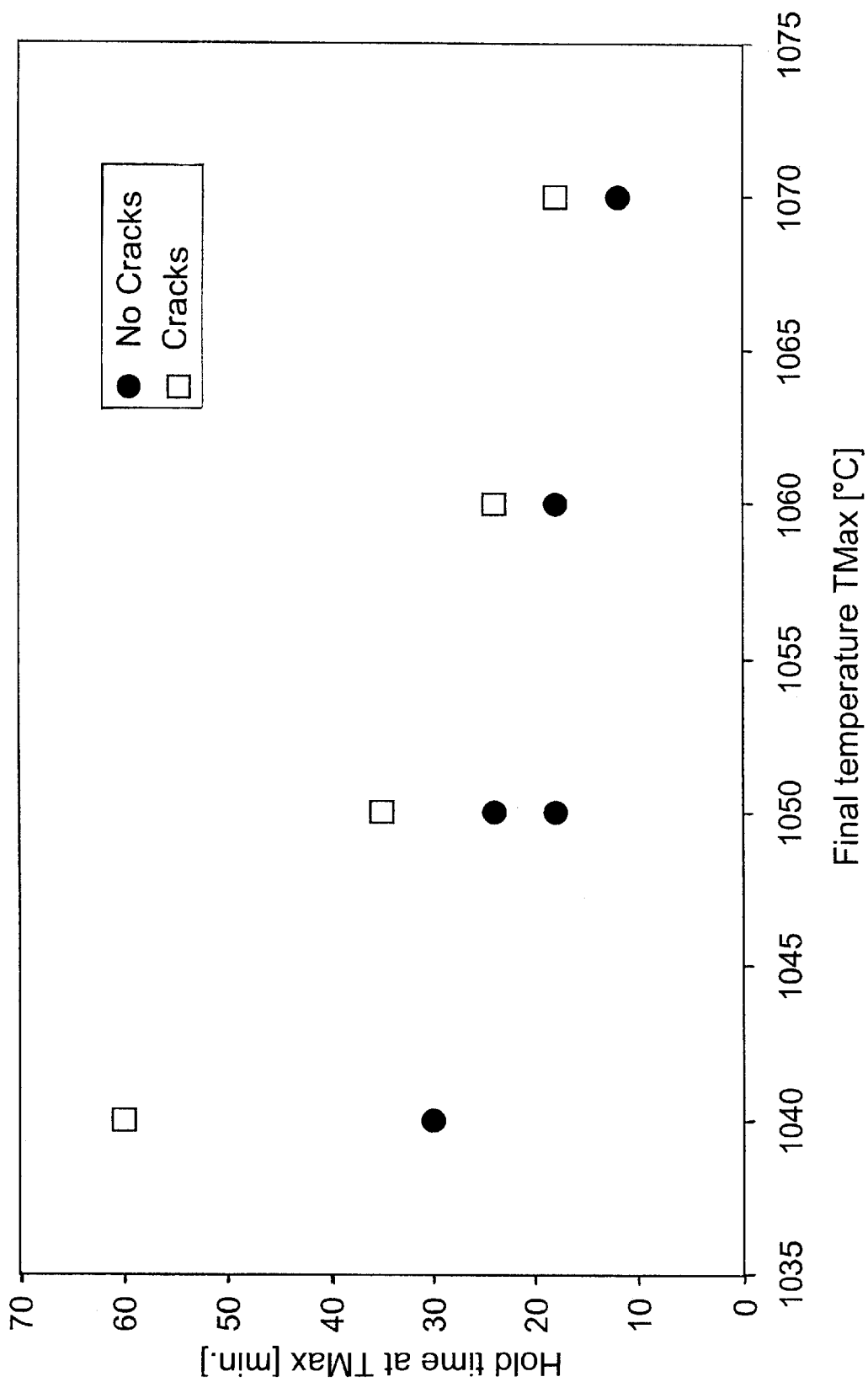
FIG. 4: is a graphic illustration of the occurrence of surface cracks for the specimens.

FIG. 4 comprised a graphic illustration of the occurrence of surface cracks for the specimens, as will be discussed in greater detail below.

Figure 5:
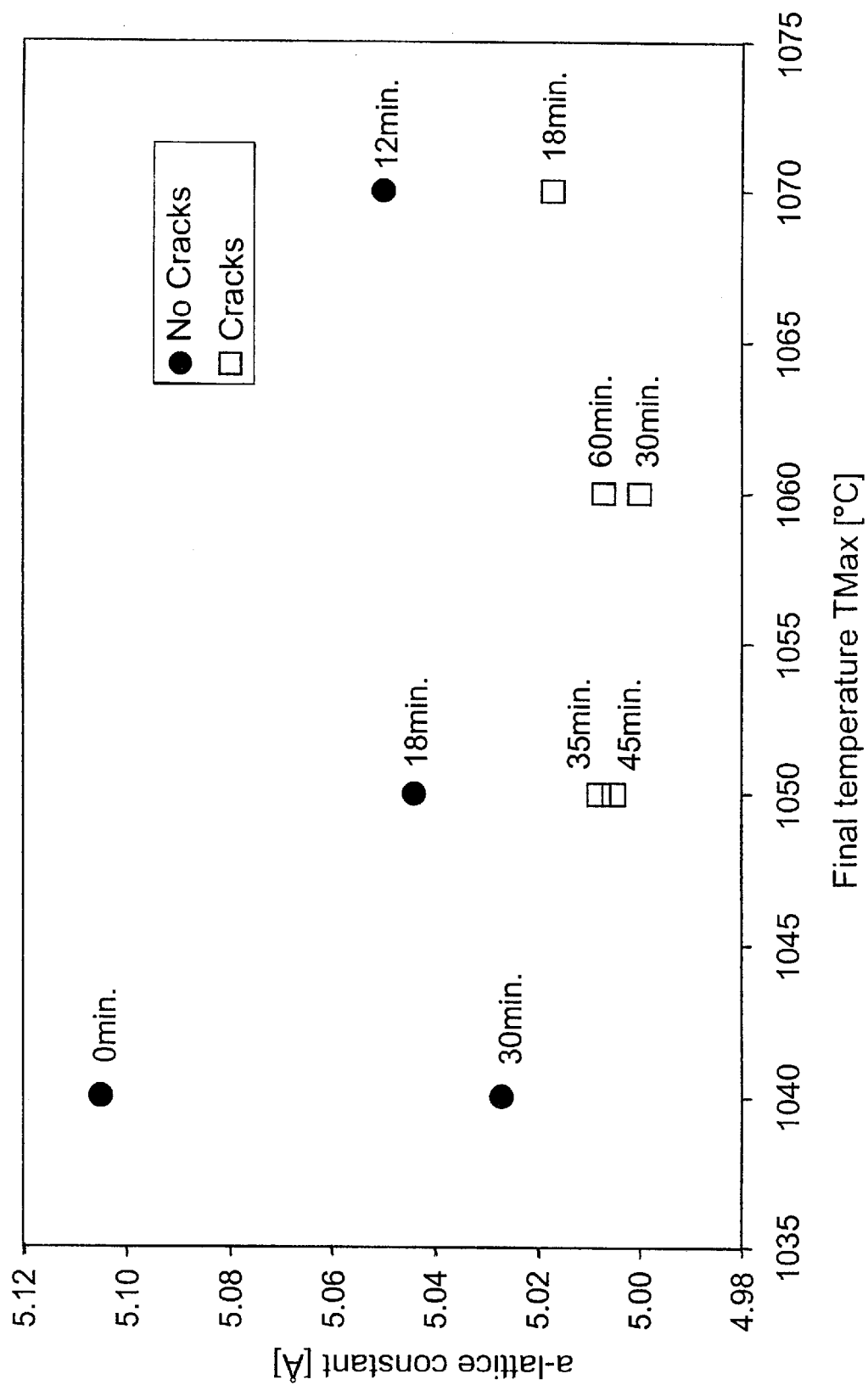
FIG. 5: shows the a-lattice constant determined with thin-film X-ray diffraction of the quartz phase near the surface of the specimens with and without surface cracks.

FIG. 5 shows the a-lattice constant determined with thin-film X-ray diffraction of the quartz phase near the surface of the specimens with and without surface cracks, as will be discussed further below.

Figure 6:
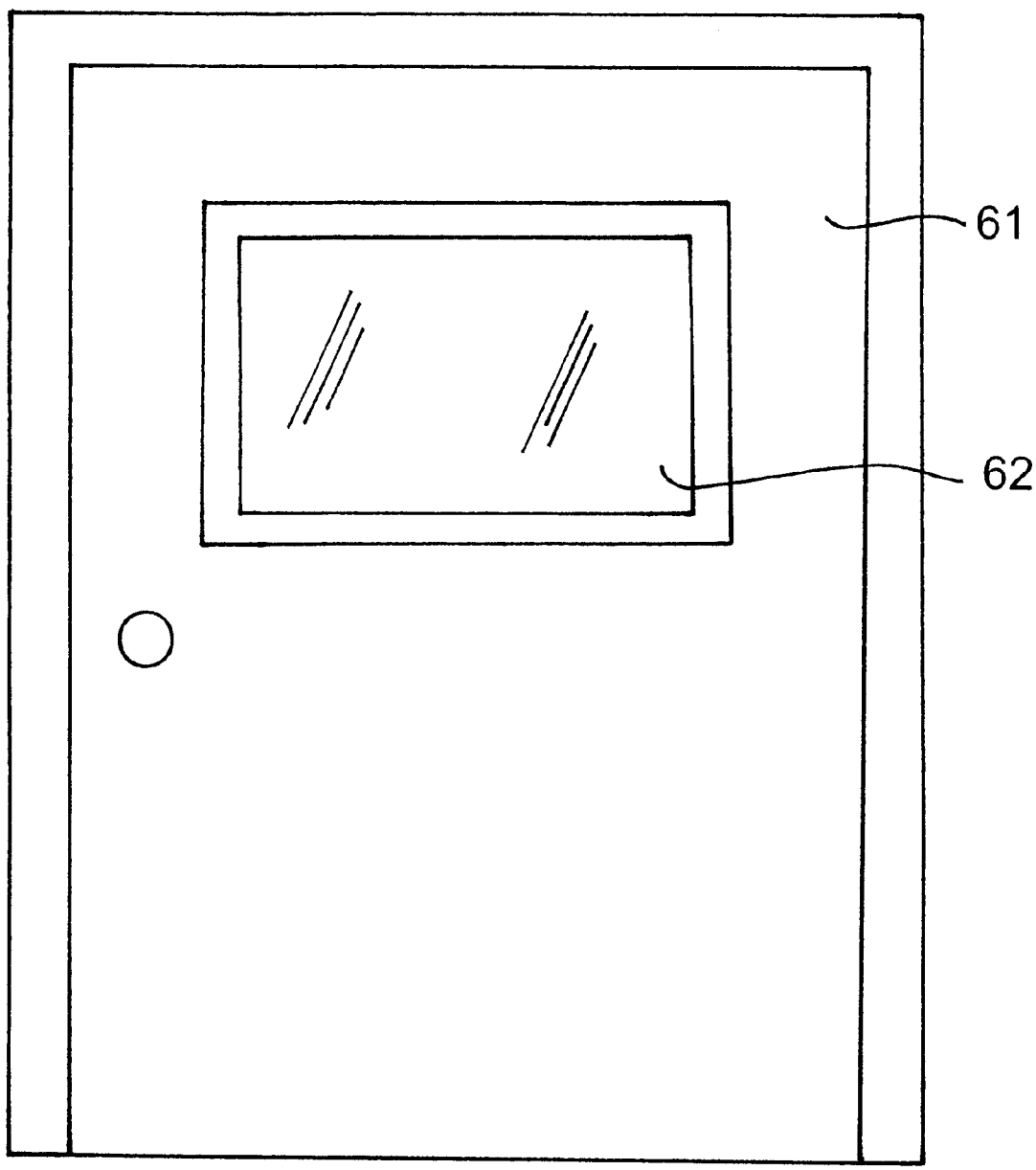
FIG. 6: shows an example of a fire protective door with a fire protective window comprised of transparent glass ceramic.

FIG. 6 illustrates an embodiment comprising a fire protection door 61 having a fire protection window pane 62. The fire protection window pane 61 comprises a transparent glass ceramic in accordance with one aspect of the invention.

Figure 7:
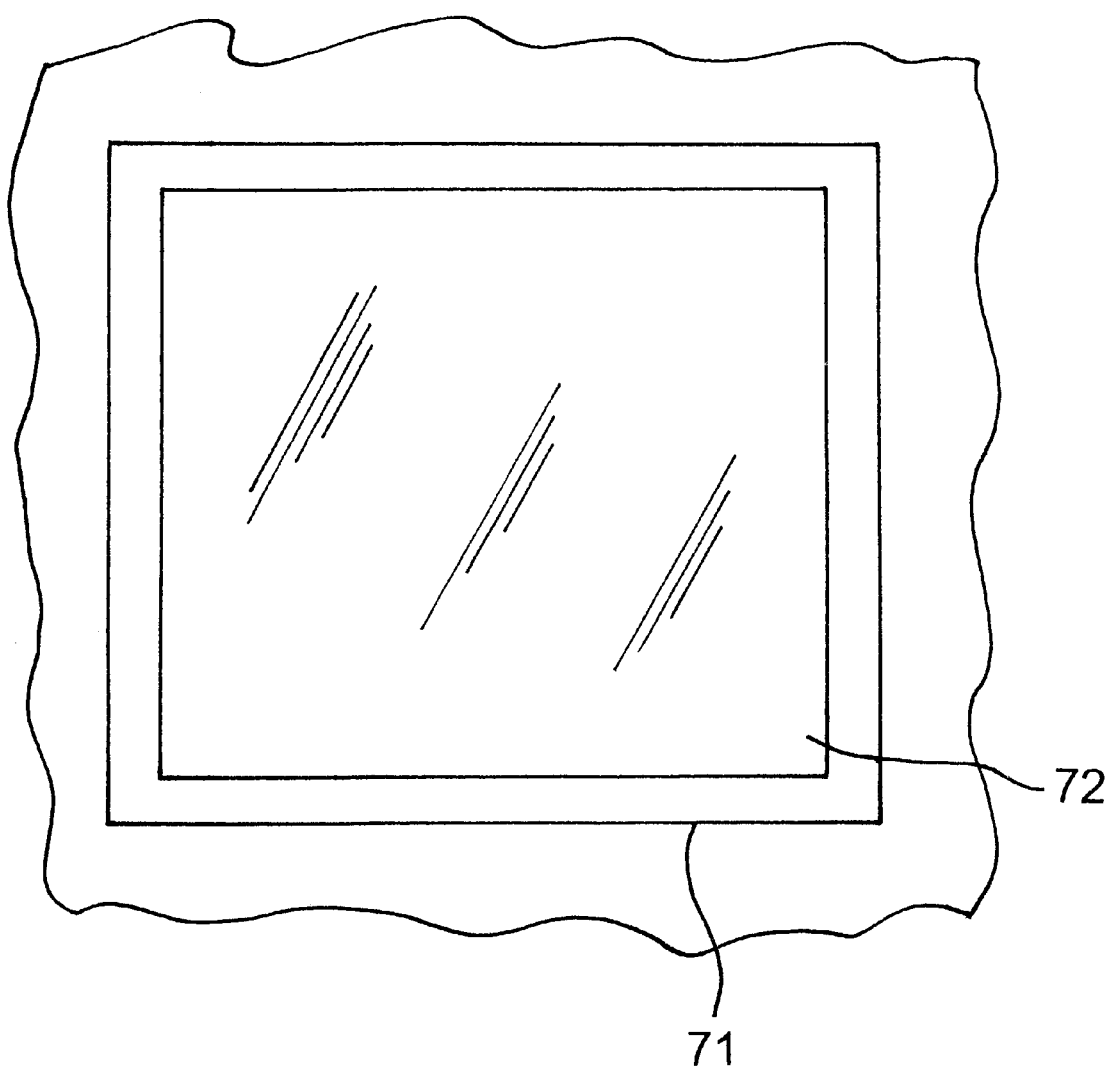
FIG. 7: shows a fire protective window.

FIG. 7 illustrates an embodiment of a fire protection window 71 having a transparent fire protection glass ceramic in accordance with a further aspect of the invention.

Figure 8:
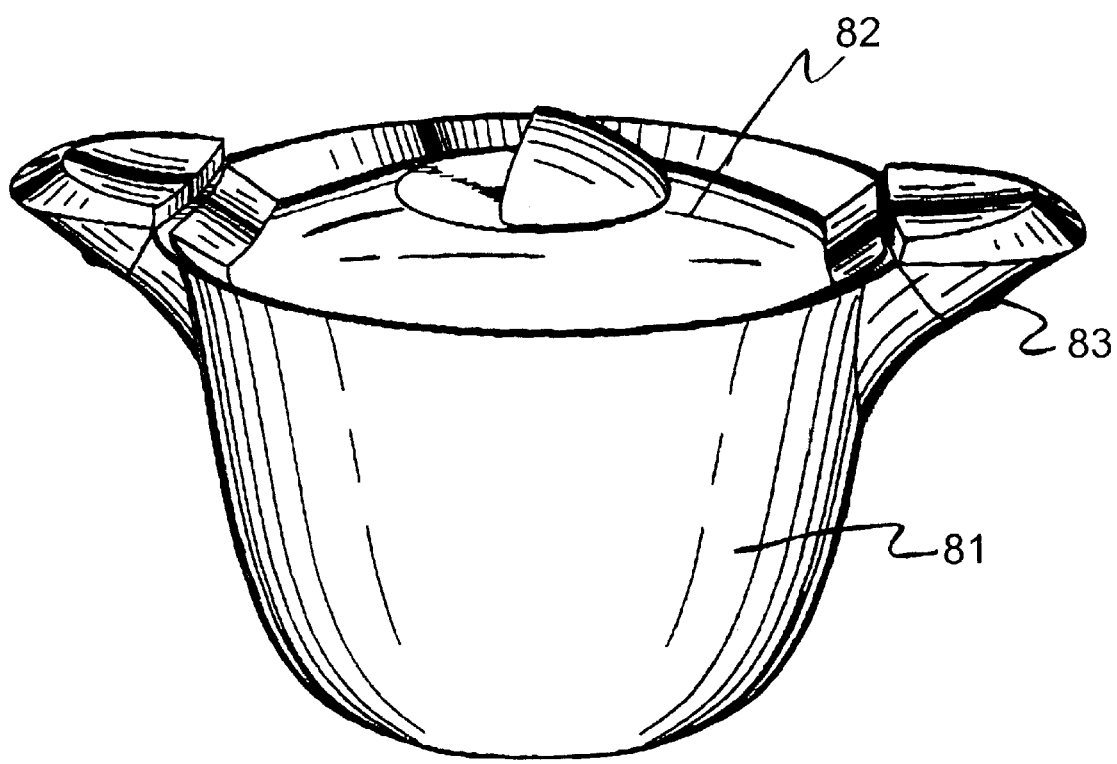
FIG. 8: illustrates an item of cookware comprising glass ceramic.

FIG. 8 illustrates an embodiment of an item of culinary ware, ovenware, direct oven-to-table cookware, and cookware, generally depicted by an item of cookware 81 comprising a lid 82 and handle portions 83. The item of cookware 81 comprises an opaque glass ceramic, or a transparent glass ceramic, in accordance with still other aspects of the invention.

Figure 9:
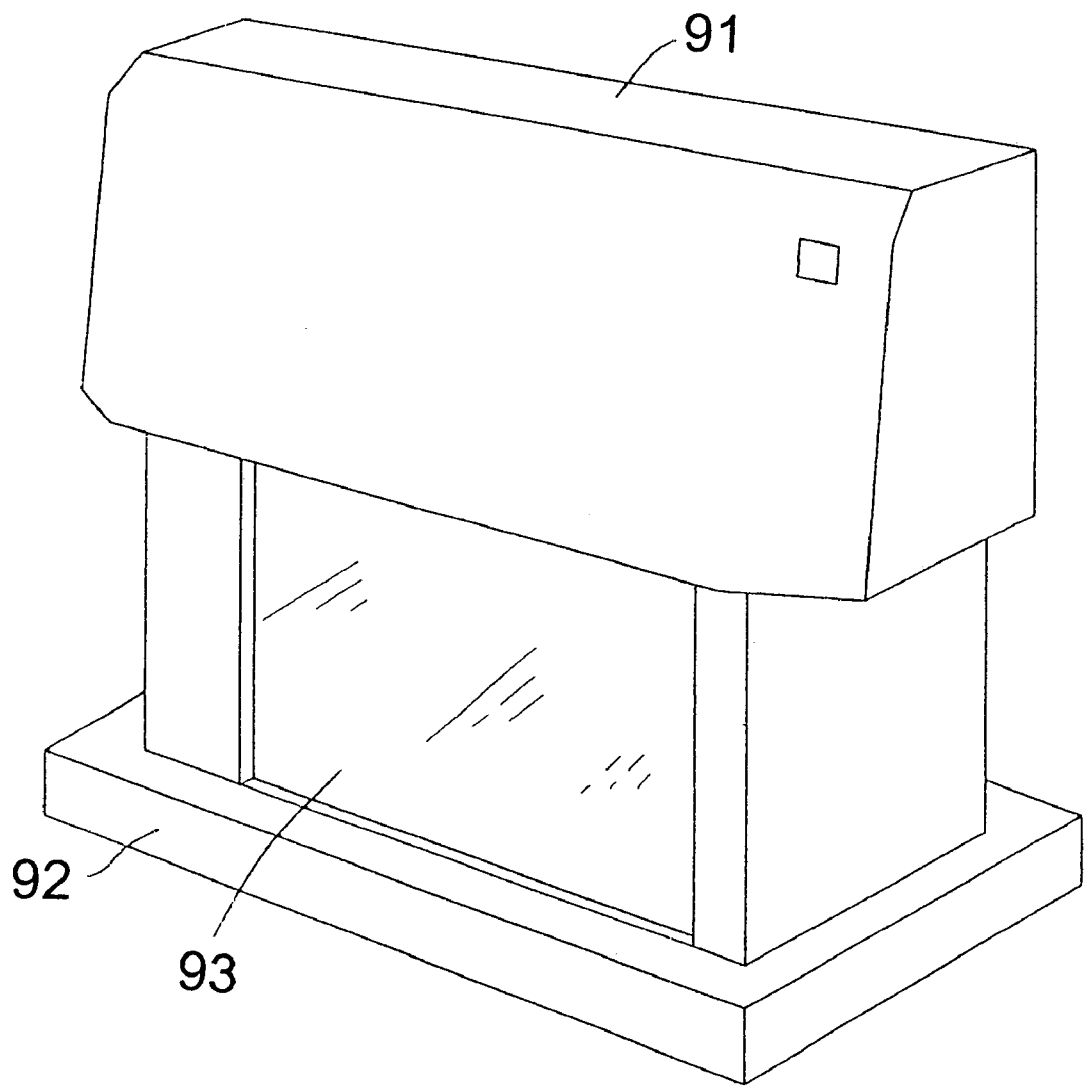
FIG. 9: illustrates a fireplace with a transparent glass ceramic fire screen.
Figure 10:
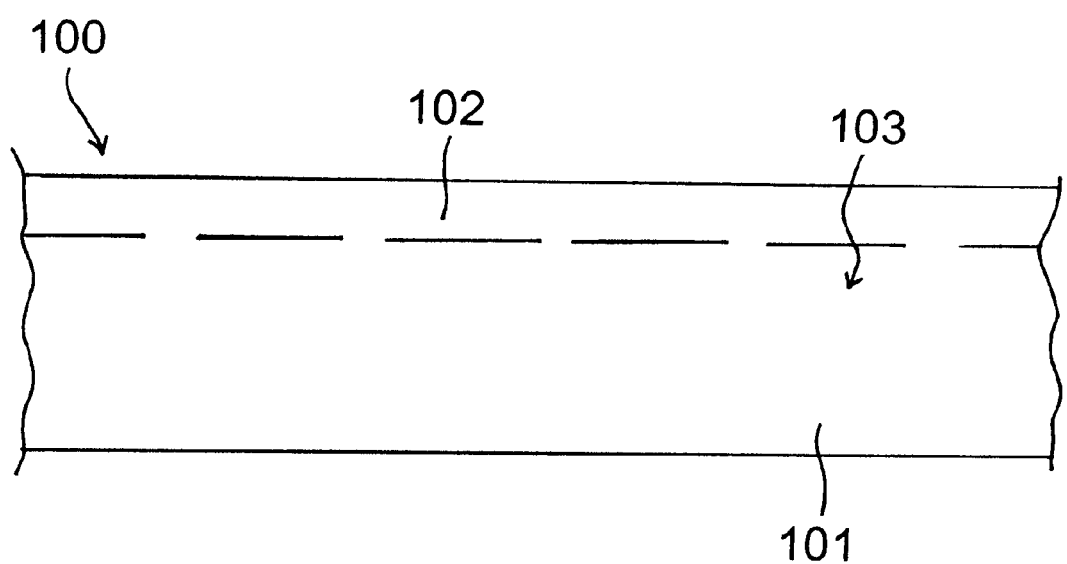
FIG. 10: illustrates a glass ceramic with an inner layer and an upper layer.

FIG. 9 illustrates an embodiment of a fireplace 91 having a base 92 and a transparent fire protection screen 93. The fire protection screen 93 comprises a transparent glass ceramic in accordance with yet another aspect of the invention.

The initial glass was melted using raw materials conventionally used in the glass industry at temperatures of approximately one thousand and six hundred and forty degrees Celsius and fined. It was formed using conventional methods such as casting or rolling. Castings were cooled in a cooling furnace from approximately six hundred and eighty degrees Celsius to room temperature, and divided into the sizes required for the tests.

After the fusion and hot forming, the material was conventionally cooled to below the inversion temperature. In other words, the material may be cooled to below the transformation temperature. The initial glass was then transformed by controlled crystallization into a glass ceramic item. This ceramization takes place in a multiple-stage temperature process, in which first by nucleation at a temperature between approximately six hundred degrees Celsius to eight hundred degrees Celsius nuclei or seeds, generally consisting of titanium dioxide or zirconium dioxide/titanium dioxide mixed crystals, are generated, although tin dioxide can also participate in the nucleation. During the subsequent temperature increase, at the crystallization temperature of approximately seven hundred and fifty degrees Celsius to nine hundred degrees Celsius, first high quartz mixed crystals formed on these nuclei. As the temperature was increased further in the range of approximately nine hundred degrees Celsius to twelve hundred degrees Celsius, these high quartz mixed crystals were further transformed into keatite mixed crystals. The transformation into keatite mixed crystals was accompanied by a crystal growth, i.e. increasing crystallite size, as a result of which there is an increasing diffraction of light, i.e. the light transmissivity is reduced.

Table 1 shows the composition of the types of glass claimed by the invention and the low concentrations of coloring impurities.

Table 1—composition of glass on oxide basis in weight percent; Glass No. 1: lithium oxide comprising three and five tenths percent; sodium monoxide comprising two tenths percent; potassium monoxide comprising two tenths percent; magnesium oxide comprising one and two tenths percent; barium oxide comprising one percent; zinc oxide comprising one and seven tenths percent; aluminum oxide comprising twenty and two tenths percent; silicon dioxide comprising sixty-six and nine tenths percent; titanium dioxide comprising two and seven tenths percent; zirconium dioxide comprising one and seven tenths percent; arsenic trioxide comprising seven tenths percent; sum: one hundred percent. Glass No. 2: lithium oxide comprising three and five tenths percent; sodium monoxide comprising fifteen hundredths percent; potassium monoxide comprising two tenths percent; magnesium oxide comprising one and fifteen hundredths percent; barium oxide comprising eight tenths percent; zinc oxide comprising one and five tenths percent; aluminium oxide comprising twenty percent; silicon dioxide comprising sixty-seven and two tenths percent; titanium dioxide comprising two and six tenths percent; zirconium dioxide comprising one and seven tenths percent; arsenic trioxide comprising one and two tenths percent; sum: one hundred percent.

Table 1A—coloring impurities in parts per million: Glass No. 1: vanadium pentoxide comprising six parts per million; molybdenum trioxide comprising two parts per million; cobalt oxide comprising less than one part per million; nickel oxide comprising four parts per million; manganese dioxide comprising less than one part per million; chromic oxide comprising less than 10 parts per million.

No data given for Glass No. 2.

The following transformations (ceramizations) were manufactured from the types of glass listed above.

In the examples in Table 2, a total of fifteen to twenty plates were transformed, from which the impact strengths and the ability to withstand temperature differences were determined.

Example 1: Plate-shaped green glass objects having a thickness of four millimeters with a composition the same as Glass No. 1 were brought from room temperature at a heating rate of eleven degrees kelvin per minute to a temperature of eight hundred and forty degrees Celsius and held there for approximately eighteen minutes for the crystallization of the high quartz mixed crystals. Then the material was brought at nine and five tenths degrees Kelvin per minute to a maximum temperature of one thousand and sixty-five degrees Celsius, where it was held for twenty-three minutes. The translucent glass ceramic was cooled at a cooling rate of approximately twelve degrees Kelvin per minute to nine hundred and fifty degrees Celsius and then allowed to cool further to room temperature at the uncontrolled cooling rate of the furnace. In other words, further cooling is done at the cooling rate of the furnace. Table 2 shows the resulting characteristics of the translucent glass ceramic obtained in Example 1. The white value, color and impact strength were determined on specimens four millimeters thick. To measure the light transmission, the specimen was polished on both sides, and the specimen thickness, which is therefore slightly less than four millimeters, is presented in Table 2.

Table 2—characteristics of the transformed glass ceramics: example 1: Glass No. 1; light transmission tau in percent comprising nine and four tenths percent; specimen thickness in millimeters comprising three and fifty-eight hundredths millimeters; white color value L* comprising eighty-three and one tenth; color C* comprising five and two tenths; a* comprising negative three and three tenths; b* comprising negative four and one tenth; impact strength in centimeters comprising twenty-three centimeters; ability to withstand temperature differences in degrees Celsius comprising seven hundred and thirty-five degrees Celsius; coefficient of thermal expansion alpha twenty to seven hundred degrees Celsius in millionths per degree Kelvin comprising one millionth per degree Kelvin.

Example 2: Glass No. 1; light transmission tau in percent comprising nine and two tenths percent; specimen thickness in millimeters comprising three and fifty-eight hundredths millimeters; white color value L* comprising eighty-two and nine tenths; color C* comprising five and five tenths; a* comprising negative three and four tenths; b* comprising negative four and three tenths; impact strength in centimeters comprising twenty-five centimeters; ability to withstand temperature differences in degrees Celsius comprising six hundred and eighty-nine degrees Celsius; no data given for coefficient of thermal expansion alpha twenty to seven hundred degrees Celsius in ten to the minus six per degree Kelvin.

Example 3: Glass No. 1, light transmission tau in percent comprising eight and four tenths percent; specimen thickness in millimeters comprising three and fifty-five hundredths millimeters; white color value L* comprising eighty-four; color C* comprising four and six tenths; a* comprising negative three and one tenth; b* comprising negative three and three tenths; impact strength in centimeters comprising twenty-six centimeters; ability to withstand temperature differences in degrees Celsius comprising seven hundred and twenty-five degrees Celsius; no data given for coefficient of thermal expansion alpha twenty to seven hundred degrees Celsius in millionths per degree Kelvin.

Example 2: plate-shaped green glass objects having a thickness of four millimeters with the composition of Glass No. 1 were transformed using the following ceramization program. The four millimeters thick green glass plates were brought to eight hundred and five degrees Celsius at a heating rate of eleven degrees Kelvin per minute and held there for twenty-three minutes. Then the material was heated at nine and five tenths degrees Kelvin per minute to a maximum temperature of one thousand and sixty degrees Celsius and held there for twenty-three minutes. The material was cooled at twelve degrees Kelvin per minute to nine hundred and fifty degrees Celsius and was then further cooled to room temperature at the cooling rate of the furnace. With this transformation program, a translucent glass ceramic was obtained that has the characteristics listed in Table 2.

Example 3: in this example, plate-shaped green glass objects four millimeters thick having the composition of Glass No. 1 were used. The green glass plates were heated at eleven degrees Kelvin per minute to eight hundred and forty-five degrees Celsius. The material was held at this temperature for twenty-three minutes. Then the material was further heated at nine and five tenths degrees Kelvin per minute to a maximum temperature of one thousand and sixty degrees Celsius and held there for twenty-three minutes. It was then cooled at twelve degrees Kelvin per minute to eight hundred and thirty-five degrees Celsius and from there further cooled at the cooling rate of the furnace to room temperature. The characteristics of the transformed glass ceramic obtained are presented in Table 2 under Example 3.

Examples 4 to 12: in these examples, plate-shaped green glass objects four millimeters thick were all transformed following the same program. The composition of the examples is the same as the composition of Glass No. 1 in Table 1. The plate-shaped specimens were all heated at the same heating rate of seven and five tenths degrees Kelvin per minute to the maximum temperature and held there for the indicated times. During the heating at a constant heating rate, the crystallization of the high quartz mixed crystals occurred in the temperature range between seven hundred and sixty degrees Celsius and eight hundred and fifty degrees Celsius.

Table 3 shows the relationship between the manufacturing conditions when the maximum temperature and holding time are varied, the characteristics white value L*, color (specimen thickness four millimeters), light transmission tau (polished specimens, thickness as indicated in Table 3) and the occurrence of surface cracks. It is clear that as the maximum temperature and/or the hold time increases, the white value L* and the light transmission tau decrease. If the hold time at the specified heating rate and the respective maximum temperature is too long, the silicon dioxide content in the high quartzes near the surface is enriched, and when the glass ceramic cools there is an undesirable transformation of the high quartz mixed crystals into the low quartz structure. The surface cracks that result reduce the impact strength below the required values. This is the case with Examples 5, 8, 10 and 12.

Table 3: manufacturing conditions and characteristics of glass ceramics; Example 4, Glass No. 1; maximum temperature Tmax in degrees Celsius comprising one thousand and forty degrees Celsius; hold time in minutes comprising thirty minutes; light transmission tau in percent comprising eight and seven tenths percent; specimen thickness in millimeters comprising three and fifty-nine hundredths millimeters; white value L* comprising eighty-three and two tenths; color C* comprising five and two tenths; a* comprising negative three and three tenths; b* comprising negative four; surface cracks—no.

Example 5: Glass No. 1; maximum temperature Tmax in degrees Celsius comprising one thousand and forty degrees Celsius; hold time in minutes comprising sixty minutes; light transmission tau in percent comprising four and eight tenths percent; specimen thickness in millimeters comprising three and fifty-nine hundredths millimeters; white value L* comprising eighty-six and eight tenths; color C* comprising two and five tenths; a* comprising negative one and eight tenths; b* comprising negative one and seven tenths, surface cracks—yes.

Example 6: Glass No. 1; maximum temperature Tmax in degrees Celsius comprising one thousand and fifty degrees Celsius; hold time in minutes comprising eighteen minutes; light transmission tau in percent comprising ten and nine tenths percent; specimen thickness in millimeters comprising three and fifty-six hundredths millimeters; no data given for white value L*, color C*, a*, and b*; surface cracks—no.

Example 7: Glass No. 1: maximum temperature Tmax in degrees Celsius comprising one thousand and fifty degrees Celsius; hold time in minutes comprising twenty-four minutes; light transmission tau in percent comprising seven and eight tenths percent; specimen thickness in millimeters comprising three and fifty-seven hundredths millimeters; white value L* comprising eighty-four and one tenth; color C* comprising four and five tenths; a* comprising negative two and nine tenths; b* comprising negative three and four tenths; surface cracks—no.

Example 8: Glass No. 1; maximum temperature Tmax in degrees Celsius comprising one thousand and fifty degrees Celsius; hold time in minutes comprising thirty-five minutes; light transmission tau in percent comprising five and eight tenths percent; specimen thickness in millimeters comprising three and fifty-nine hundredths millimeters; white value L* comprising eighty-six and eight tenths; color C* comprising two and nine tenths; a* comprising negative two and one tenth; b* comprising negative one and nine tenths; surface cracks—yes.

Example 9: Glass No. 1; maximum temperature Tmax in degrees Celsius comprising one thousand and sixty degrees Celsius; hold time in minutes comprising eighteen minutes; light transmission tau in percent comprising six and nine tenths percent; specimen thickness in millimeters comprising three and fifty-nine hundredths millimeters; white value L* comprising eighty-five and one tenth; color C* comprising three and nine tenths; a* comprising negative two and six tenths; b* comprising negative two and nine tenths; surface cracks—no.

Example 10: Glass No. 1; maximum temperature Tmax in degrees Celsius comprising one thousand and sixty degrees Celsius; hold time in minutes comprising twenty-four minutes; light transmission tau in percent comprising four and one tenth percent; specimen thickness in millimeters comprising three and six tenths millimeters; white value L* comprising eighty-seven and nine tenths; color C* comprising one and nine tenths; a* comprising negative one and four tenths; b* comprising negative one and three tenths; surface cracks—yes.

Example 11: Glass No. 1; maximum temperature Tmax in degrees Celsius comprising one thousand and seventy degrees Celsius; hold time in minutes comprising twelve minutes; light transmission tau in percent comprising seven and two tenths percent; specimen thickness in millimeters comprising three and six tenths millimeters; white value L* comprising eighty-four and eight tenths; color C* comprising four and one tenth; a* comprising negative two and seven tenths; b* comprising negative three and one tenth; surface cracks—no.

Example 12: Glass No. 1; maximum temperature Tmax in degrees Celsius comprising one thousand and seventy degrees Celsius; hold time in minutes comprising eighteen minutes; light transmission tau in percent comprising four and nine tenths percent; specimen thickness in millimeters comprising three and fifty-nine hundredths millimeters; white value L* comprising eighty-seven and three tenths; color C* comprising two and five tenths; a* comprising negative one and seven tenths; b* comprising negative one and seven tenths; surface cracks—yes.

FIG. 4 is a graphic illustration of the occurrence of surface cracks for the specimens in Table 3 when the hold time is too long. On the basis of corresponding diagrams, an empirical determination of the allowable hold time can be made for each composition at a specified heating rate and maximum temperature. FIG. 5 shows the a-lattice constant determined with thin-film X-ray diffraction of the quartz phase near the surface of the specimens with and without surface cracks. The silicon dioxide content of equal to or greater than eighty weight percent in the high quartz mixed crystals near the surface, which is critical for the transformation into the low quartz structure, occurs in this composition when the a-lattice constant is equal to or less than five and two hundredths angstroms.

Examples 13 to 17: in these examples, different types of glass having the basic composition of Glass 2 in Table 1 were dosed with different coloring components and melted. Plate-shaped green glass objects four millimeters thick were transformed at a maximum temperature of one thousand and twenty degrees Celsius and a hold time of one hour. Table 4 shows the colors, light transmission values (polished specimens, four millimeters thick) and white values obtained with the various additions.

Table 4: characteristics of glass ceramics to which coloring components have been added—Example 13: Glass No. 2; dosing in parts per million with vanadium pentoxide comprising fifty-five parts per million; shade comprising light gray; light transmission tau in percent comprising seven and six tenths percent; white value L* comprising sixty-nine and seven tenths; color C* comprising six and six tenths; a* comprising negative two and three tenths; b* comprising negative six and two tenths.

Example 14: Glass No. 2; dosing in parts per million with molybdenum trioxide comprising thirty parts per million; shade comprising bluish gray; light transmission tau in percent comprising four and four tenths percent; white value L* comprising eighty-two and four tenths; color C* comprising five and nine tenths; a* comprising negative three and three tenths; b* comprising negative four and eight tenths.

Example 15: Glass No. 2; dosing in parts per million with iron oxide comprising four hundred and twenty parts per million; shade comprising yellowish; light transmission tau in percent comprising five and eight tenths percent; white value L* comprising eighty-four and nine tenths; color C* comprising three; a* comprising negative three; b* comprising negative one hundredth.

Example 16: Glass No. 2; dosing in parts per million with ceric oxide comprising seventeen hundred parts per million; shade comprising beige; light transmission tau in percent comprising nine and nine tenths percent; white value L* comprising seventy-eight and four tenths; color C* comprising six and three tenths; a* comprising negative two and seven tenths; b* comprising five and seven tenths.

Example 17: Glass No. 2; dosing in parts per million with cobalt oxide comprising twenty parts per million, nickel oxide comprising ten parts per million, chromic oxide comprising twenty parts per million; shade comprising bluish gray; light transmission tau in percent comprising ten and nine tenths percent, white value L* comprising seventy-two and one tenth; color C* comprising eleven and one tenth, a* comprising negative three and seven tenths; b* comprising negative ten and five tenths.

One feature of the invention resides broadly in a translucent glass ceramic with a light transmission in the visible range of five tenths percent to ten percent with four millimeters specimen thickness, an impact strength of more than eighteen centimeters drop ball impact strength on average, tested with a two hundred grams steel ball in the ball drop test, an ability to withstand temperature differences of more than six hundred and fifty degrees Celsius, keatite mixed crystals as the predominant crystal phase in the center or inner layer of the glass ceramic, high quartz mixed crystals as an additional crystal phase in the surface layer of the glass ceramic, a coefficient of thermal expansion of the high quartz mixed crystals which is less than that of the keatite mixed crystals, so that a surface condition of the glass ceramic is achieved that counteracts the origin of superficial injuries that reduce strength, and an silicon dioxide content of the high quartz mixed crystals that is less than eighty weight percent, so that as the glass ceramic cools to room temperature, the transformation of the high quartz mixed crystals phase into an undesirable low quartz mixed crystals phase, which leads to cracks in the surface of the glass ceramic, is prevented.

Another feature of the invention resides broadly in a glass ceramic, characterized by the fact that the resistance of the glass ceramic to temperature differences is greater than seven hundred degrees Celsius.

Yet another feature of the invention resides broadly in a glass ceramic, characterized by the fact that the glass ceramic is plate-shaped.

Still another feature of the invention resides broadly in a glass ceramic, characterized by a composition in weight percent on an oxide basis of: lithium oxide comprising three percent to four percent; sodium monoxide comprising zero percent to one percent; potassium monoxide comprising zero percent to six tenths percent; with the sum of sodium monoxide plus potassium monoxide comprising two tenths percent to one percent; magnesium oxide comprising zero percent to one and five tenths percent; calcium oxide comprising zero percent to five tenths percent; strontium oxide comprising zero percent to one percent; barium oxide comprising zero percent to two and five tenths percent; with the sum of calcium oxide plus strontium oxide plus barium oxide comprising two tenths percent to three percent; zinc oxide comprising one percent to two and two tenths percent; aluminium oxide comprising more than nineteen and eight tenths percent to twenty-three percent; silicon dioxide comprising sixty-six percent to seventy percent; titanium dioxide comprising two percent to three percent; zirconium dioxide comprising five tenths percent to two percent; and phosphoric oxide comprising zero percent to one percent, as well as optional fining agents such as arsenic pentasulfide, antimony trioxide, tin oxide, ceric oxide and/or sulfate or chloride compounds in the conventional quantities.

A further feature of the invention resides broadly in a glass ceramic, characterized by the fact that on the immediate surface of the glass ceramic, above the layer containing the high quartz mixed crystals, there is a vitreous layer that contains elevated sodium monoxide, potassium monoxide and/or calcium oxide, strontium oxide, barium oxide contents, which is capable of protecting the glass ceramic against, among other things, the attacking of the high quartz mixed crystals by acids.

Another feature of the invention resided broadly in a glass ceramic, characterized by the fact that the vitreous layer has a thickness of one hundred nanometers to six hundred nanometers.

Yet another feature-of the invention resides broadly in a glass ceramic, characterized by the fact that the surface layer containing the high quartz mixed crystals as the crystal phase has a thickness of one tenth micrometer to two micrometers.

Still another feature of the invention resides broadly in a glass ceramic, characterized by the fact that the average grain size of the keatite mixed crystals in the interior of the glass ceramic is three tenths micrometers to two micrometers, preferably one micrometer to one and five tenths micrometers.

A further feature of the invention resides broadly in a glass ceramic, characterized by the fact that the thermal expansion of the glass ceramic between room temperature and seven hundred degrees Celsius is less than one and three tenths millionths per degree Kelvin, preferably less than one and one tenths millionths per degree Kelvin.

Another feature of the invention resides broadly in a glass ceramic, characterized by the fact that the glass ceramic has a white value in the LAB System of L* greater than eighty-three.

Yet another feature of the invention resides broadly in a glass ceramic characterized by the fact that the glass ceramic has a very low content of coloring impurities such as vanadium pentoxide less than fifteen parts per million, molybdenum trioxide less than twenty parts per million, cobalt oxide less than ten parts per million, nickel oxide less than ten parts per million and that the total content of all the listed impurities is less than thirty parts per million.

Still another feature of the invention resides broadly in a glass ceramic, characterized by the addition of coloring components such as vanadium, chromium, manganese, cerium, iron, cobalt, copper, nickel and/or selenium-chlorine compounds for a controlled modification of the white color.

A further feature of the invention resides in a glass ceramic, characterized by the fact that the glass ceramic contains coloring components such as ceric oxide, manganese dioxide and/or iron oxide to achieve a beige color.

Another feature of the invention resides broadly in a method for the production of a translucent, essentially plate-shaped glass ceramic with a light transmission in the visible range of five tenths percent to ten percent with four millimeters specimen thickness, an impact strength of more than eighteen centimeters drop ball impact strength on average, tested with a two hundred grams steel ball in the ball drop test, an ability to withstand temperature differences of more than six hundred and fifty degrees Celsius, keatite mixed crystals as the predominant crystal phase in the center or inner layer of the glass ceramic, high quartz mixed crystals as an additional crystal phase in the surface layer of the glass ceramic, a coefficient of thermal expansion of the high quartz mixed crystals which is less than that of the keatite mixed crystals, so that a surface condition of the glass ceramic is achieved that counteracts the origin of superficial injuries that reduce strength, an silicon dioxide content of the high quartz mixed crystals that is less than eighty weight percent, so that as the glass ceramic cools to room temperature, the transformation of the high quartz mixed crystals phase into an undesirable low quartz mixed crystals phase, which leads to cracks in the surface of the glass ceramic, is prevented, whereby the laminated structure with keatite mixed crystals as the predominant crystal phase in the interior of the glass ceramic and high quartz mixed crystals as the predominant crystal phase in the surface layer of the glass ceramic is produced by the fact that the temperature range of the nucleation of nucleus crystals containing zirconium/titanium from six hundred and fifty degrees Celsius to seven hundred and sixty degrees Celsius is traversed at high heating rates of more than seven degrees Kelvin per minute, the crystallization of the high quartz mixed crystal phase is performed at a temperature from seven hundred and sixty degrees Celsius to eight hundred and fifty degrees Celsius, and the hold time in the temperature range between six hundred and fifty degrees Celsius to eight hundred degrees Celsius is less than sixty minutes.

Yet another feature of the invention resides broadly in the method, characterized by the fact that a glass having the following composition (in weight percent on an oxide basis): lithium oxide comprising three percent to four percent; sodium monoxide comprising zero percent to one percent;

potassium monoxide comprising zero percent to six tenths percent; with the sum of sodium monoxide plus potassium monoxide comprising two tenths percent to one percent; magnesium oxide comprising zero percent to one and five tenths percent; calcium oxide comprising zero percent to five tenths percent; strontium oxide comprising zero percent to one percent; barium oxide comprising zero percent to two and five tenths percent; with the sum of calcium oxide plus strontium oxide plus barium oxide comprising two tenths percent to three percent; zinc oxide comprising one percent to two and two tenths percent; aluminium oxide comprising more than nineteen and eight tenths percent to twenty-three percent; silicon dioxide comprising sixty-six percent to seventy percent; titanium dioxide comprising two percent to three percent; zirconium dioxide comprising five tenths percent to two percent, and phosphoric oxide comprising zero percent to one percent; plus optional fining agents in the conventional quantities such as arsenic pentasulfide, antimony trioxide, tin oxide, ceric oxide and/or sulfate or chloride compounds is ceramized. Still another feature of the invention resides broadly in a method, characterized by the fact that the transformation of the high quartz mixed crystal phase into the keatite mixed crystal phase in the interior of the glass ceramic is performed at maximum temperatures of one thousand degrees Celsius to eleven hundred degrees Celsius and the heating rate and the hold time at the maximum temperature are selected so that the high quartz mixed crystals formed in the vicinity of the surface are not transformed into low quartz mixed crystals during cooling to room temperature.

A further feature of the invention resides broadly in a method, but whereby the glass ceramic is opaque, characterized by the fact that the ceramization of the glass ceramic is performed at temperatures higher than eleven hundred degrees Celsius and the resulting glass ceramic has a light transmission in the visible range of less than five tenths percent with a specimen thickness of four millimeters.

Another feature of the invention resides in a method, but whereby the glass ceramic is transparent, characterized by the fact that the ceramization of the glass ceramic is performed at temperatures lower than one thousand degrees Celsius and the resulting glass ceramic has a light transmission in the visible range of greater than eighty percent at a specimen thickness of four millimeters, whereby the glass ceramic has essentially high quartz mixed crystals as the predominant crystal phase.

Yet another feature of the invention resides in the use of a glass ceramic in translucent or opaque form as a cooking surface or cookware and in transparent form as fire protection glass, smokestack view windows, cookware or windows for combustion furnaces.

A further feature of the invention resides broadly in a smooth-top cooktop for cooking food, said smooth-top cooktop comprising: a cooking surface configured to cook food; at least one heat source configured to heat said cooking surface to thereby cook food; control apparatus configured and disposed to control said smooth-top cooktop; said control apparatus being connected to control said at least one heat source and thus to control heat; said smooth-top cooktop comprising glass ceramic; said cooking surface being disposed adjacent to or comprising a part of said glass ceramic; said glass ceramic comprising a first layer which becomes an upper layer upon installation; said glass ceramic also comprising a second layer which becomes an inner layer, contiguous to said upper layer, upon installation; said upper layer and said contiguous inner layer of said glass ceramic comprising a glass ceramic structure being continuously glass ceramic from said upper layer through said inner layer; said upper layer comprising a first glass ceramic material; said inner layer comprising a second glass ceramic material; said first glass ceramic material comprising a different glass ceramic material than said second glass ceramic material; and said smooth-top cooktop comprising at least one of (i.), (ii.), and (iii.): (i.) said upper layer of said glass ceramic being configured to minimize surface defects; said surface defects comprising at least one of: fissures, cracks, pits, and pores; (ii.) said inner layer of said glass ceramic being configured to provide resistance to impact to said upper layer from cooking utensils being dropped onto said upper layer of said smooth-top cooktop; and (iii.) at least said inner layer of said glass ceramic being configured to obscure visibility, through said upper layer of said glass ceramic, of said at least one heat source.

Another feature of the invention resides broadly in a glass ceramic, such as in a smooth-top cooktop, a stove with a smooth-top cooktop, a glass ceramic providing fire protection of a door or a window for a building, culinary ware, ovenware, direct oven-to-table cookware, and cookware, a glass ceramic pane to serve as a fire screen such as in a fireplace, or as a window for a self-cleaning oven, said glass ceramic comprising: a body comprising glass ceramic; said glass ceramic body comprising an outer region and an inner region; said outer region being contiguous to an ambient environment, said outer region being between said inner region and said ambient environment; said glass ceramic body comprising a glass ceramic being continuously glass ceramic from said outer region through said inner region; said glass ceramic body being configured to be transparent; and said glass ceramic comprising at least one of (i.) and (ii.): (i.) said outer region being configured to minimize surface defects; said surface defects comprising at least one of: fissures, cracks, pits, and pores; and (ii.) said inner region being configured to provide resistance to impact to said outer region.

A further feature of the invention resides broadly in a method of making a smooth-top cooktop, said smooth-top cooktop comprising: a cooking surface configured to cook food; at least one heat source configured to heat said cooking surface to thereby cook food; control apparatus configured and disposed to control said smooth-top cooktop; said control apparatus being connected to control said at least one heat source and thus to control heat; said smooth-top cooktop comprising glass ceramic; said cooking surface being disposed adjacent to or comprising a part of said glass ceramic; said glass ceramic (101) comprising a first layer (102) which becomes an upper layer upon installation; said glass ceramic also comprising a second layer (101) which becomes an inner layer, contiguous (103) to said upper layer, upon installation; said upper layer and said contiguous inner layer of said glass ceramic comprising a glass ceramic structure being continuously glass ceramic from said upper layer through said inner layer; said upper layer comprising a first glass ceramic material; said inner layer comprising a second glass ceramic material; said first glass ceramic material comprising a different glass ceramic material than said second glass ceramic material; said smooth-top cooktop comprising at least one of (i.), (ii.), and (iii.): (i.) said upper layer of said glass ceramic being configured to minimize surface defects; said surface defects comprising at least one of: fissures, cracks, pits, and pores; (ii.) said inner layer of said glass ceramic being configured to provide resistance to impact to said upper layer from cooking utensils being dropped onto said upper layer of said smooth-top cooktop; and (iii.) at least said inner layer of said glass ceramic being configured to obscure visibility, through said upper layer of said glass ceramic, of said at least one heat source; said method comprising the steps of: configuring, by ceramization, said upper layer and said inner layer; configuring the inner layer to comprise a glass ceramic material chemically different than the glass ceramic material of said upper layer; configuring said upper layer and said contiguous inner layer of said glass ceramic as a glass ceramic structure to be continuously glass ceramic from said upper layer through said inner layer; treating said upper layer to be configured to minimize surface defects; treating said inner layer of said glass ceramic to be configured to provide resistance to impact to said upper layer from cooking utensils being dropped onto said upper layer of said smoothtop cooktop; and treating at least said inner layer of said glass ceramic to be configured to obscure visibility, through said upper layer of said glass ceramic, of said at least one heat source.

The components disclosed in the various publications, disclosed or incorporated by reference herein, may be used in the embodiments of the present invention, as well as equivalents thereof.

The appended drawings in their entirety, including all dimensions, proportions and/or shapes in at least one embodiment of the invention, are accurate and are hereby included by reference into this specification.

All, or substantially all, of the components and methods of the various embodiments may be used with at least one embodiment or all of the embodiments, if more than one embodiment is described herein.

All of the patents, patent applications and publications recited herein, and in the Declaration attached hereto, are hereby incorporated by reference as if set forth in their entirety herein.

The following patents, patent applications, or patent publications, and their published equivalents, as applicable, which were cited in the Search Report of the European Patent Office dated Apr. 12, 2001, and/or cited elsewhere, are hereby incorporated by reference as if set forth in their entirety herein as follows: European Patent No. 1 029 830 of SCHOTT GLASWERKE; ZEISS STIFTUNG, dated Aug. 23, 2000; U.S. Pat. No. 4,211,820 of Jul. 8, 1980, mentioned above; U.S. Pat. No. 4,218,512 of Aug. 19, 1980, mentioned above; DE 33 45 316 to CORNING GLASS WORKS of Jun. 20, 1984, having corresponding U.S. Pat. No. 4,455,160 and 4,438,210; and European Patent Application No. 0 220 333 to SCHOTT GLASWERKE; ZEISS STIFTUNG, of May 6, 1987, having corresponding U.S. Pat. No. 5,212,122; Nordmann, A. et al., "Crystallization behaviour and microstructural evolution of $Li_2O$—$Al_2O_3$—$SiO_2$ glass derived from spodumene mineral," JOURNAL OF MATERIAL SCIENCE, GB, CHAPMAN AND HALL LTD., London, Vol. 32, No. 1, 1997, pages 83 to 89, ISSN: 0022-2461; Ramos, A. et al., "Earliest stages of crystal growth in a silicate glass containing titanium and zirconium as nucleating elements—HRTEM and XAS study," JOURNAL OF CRYSTAL GROWTH, NL, NORTH-HOLLAND PUBLISHING CO., Amsterdam, Vol. No. 100, No. 3, Mar. 1, 1990, pages 471 to 480, ISSN: 0022-0248; U.S. Pat. No. 5,491,115 issued on Feb. 13, 1996; EP 0 711 737 to CORNING INC., of May 15, 1996, having corresponding U.S. Pat. No. 5,512,520; U.S. Pat. No. 3,573,074 of Mar. 30, 1971; Korean Patent No. 9 709 316 of Jun. 10, 1997; Scheidler, H. et al, "$Li_2O$—$Al_2O_3$—$SiO_2$ glass ceramics," AMERICAN CERAMIC SOCIETY BULLETIN, US, AMERICAN CERAMIC SOCIETY, Columbus, OH, Vol. No. 68, No. 11, Nov. 1, 1989, pages 1926 to 1930, ISSN: 0002-7812; Jewel, J. M. et al., "Effect of heat-treatment temperature on the properties of a lithium aluminosilicate glass," JOURNAL OF THE AMERICAN CERAMIC SOCIETY, US, AMERICAN CERAMIC SOCIETY, Columbus, OH, Vol. No. 74, No. 1, 1991, pages 92 to 97, ISSN: 0002-7820; and EP 0 536 478 to CORNING INC., of Apr. 14, 1993, having corresponding U.S. Pat. No. 5,173,453.

The components disclosed in the various publications, disclosed or incorporated by reference herein, may be used in the embodiments of the present invention, as well as equivalents thereof.

The appended drawings in their entirety, including all dimensions, proportions and/or shapes in at least one embodiment of the invention, are accurate and are hereby included by reference into this specification.

All, or substantially all, of the components and methods of the various embodiments may be used with at least one embodiment or all of the embodiments, if more than one embodiment is described herein.

All of the patents, patent applications and publications recited herein, and in the Declaration attached hereto, are hereby incorporated by reference as if set forth in their entirety herein.

The corresponding foreign patent publication applications, namely, EP 00114268.6 filed on Jul. 4, 2000, having the title, "TRANSLUZENTE GLASKERAMIK, VERFAHREN ZUR HERSTELLUNG EINER TRANSLUZENTEN GLASKERAMIK SOWIE DEREN VERFAHREN," and inventors Dr. Ina MITRA, Dr. Friedrich SIEBERS, Dr. Otmar BECKER, Dr. Andreas SCHMINKE, Dr. Bernd RUDINGER, Christian ROOS, Dr. Evelin WEISS, Roland DUDEK, and Dr. Erich RODEK, as well as published equivalents, and other equivalents or corresponding applications, if any, in corresponding cases in the Federal Republic of Germany and elsewhere, and the references and documents cited in any of the documents cited herein, such as the patents, patent applications and publications, are hereby incorporated by reference as if set forth in their entirety herein.

All of the references and documents, cited in any of the documents cited herein, are hereby incorporated by reference as if set forth in their entirety herein. All of the documents cited herein, referred to in the immediately preceding sentence, include all of the patents, patent applications and publications cited anywhere in the present application.

Another foreign patent publication application, namely, Federal Republic of Germany Patent Application No. DE 100 17 701. 8–45, filed on Apr. 8, 2000, [NHL-FMW-01 US (SCT)] having inventors Dr. Friedrich SIEBERS, Dr. Peter NAβ, Dr. Gerhard LAUTENSCHLÄGER, and Dr. Otmar BECKER, entitled, "Gefloatetes Flachglas," and DE-OS 100 17 701. 8–45 and DE-PS 100 17 701. 8–45, as well as their published equivalents, and other equivalents or corresponding applications, if any, in corresponding cases in the Federal Republic of Germany and elsewhere, and the references cited in any of the documents cited herein, are hereby incorporated by reference as if set forth in their entirety herein.

Another foreign patent publication, namely, Federal Republic of Germany Patent Application No. DE 100 17 701. 8–45, filed on Apr. 8, 2000, [NHL-FMW-02 US (SCT)] having inventors Dr. Friedrich SIEBERS, Dr. Peter NASS, Dr. Gerhard LAUTENSCHLÄGER, and Dr. Otmar BECKER, entitled," Glas sowie Verfahren zu seiner Herstellung und Verwendung desselben," and DE-OS 100 17 701. 8–45 and DE-PS 100 17 701. 8–45, as well as their published equivalents, and other equivalents or corresponding applications, if any, in corresponding cases in the Federal Republic of Germany and elsewhere, and the references cited in any of the documents cited herein, are hereby incorporated by reference as if set forth in their entirety herein.

Yet another foreign patent publication application, namely, Federal Republic of Germany Patent Application No. DE 100 17 699. 2–45, filed on Apr. 8, 2000, [NHL-FMW-03 US (SCT)] having inventors Dr. Sabine MELSON and Stefan HUBERT, entitled "Verglasung von gegenüber der Umgebung im Weltraum oder in Polarregionen abgekapselten Räumen," and DE-OS 100 17 699. 2–45 and DE-PS 100 17 699. 2–45, as well as their published equivalents, and other equivalents or corresponding applications, if any, in corresponding cases in the Federal Republic of Germany and elsewhere, and the references cited in any of the documents cited herein, are hereby incorporated by reference as if set forth in their entirety herein.

A further foreign patent publication application, namely, Federal Republic of Germany Patent Application No. DE 100 17 696. 8–33, filed on Apr. 8, 2000, [NHL-FMW-04 US (SCT)] having inventors Dr. Sabine MELSON and Dr. Peter NAβ, entitled, "Transparente Abdeckung der Strahlungsquelle von Lampen," and DE-OS 100 17 696. 8–33 and DE-PS 100 17 696. 8–33, as well as their published equivalents, and other equivalents or corresponding applications, if any, in corresponding cases in the Federal Republic of Germany and elsewhere, and the references cited in any of the documents cited herein, are hereby incorporated by reference as if set forth in their entirety herein.

The details in the patents, patent applications and publications may be considered to be incorporable, at Applicants option, into the claims during prosecution as further limitations in the claims to patentably distinguish any amended claims from any applied prior art.

The following U.S. Patent Application is to be incorporated by reference as follows: U.S. patent application Ser. No. 09/828,288, filed on Apr. 6, 2001, entitled, "A cooking arrangement for cooking food such as a stove, a cooktop, and other cooking appliances, with an easy-to-clean surface," having attorney docket No. NHL-FMW-01 US (SCT), having inventors Dr. Sabine MELSON, Dr. K. SCHAUPERT, and Dr. Peter NAB62, is hereby incorporated by reference as if set forth in its entirety herein.

The following U.S. Patent Application is to be incorporated by reference as follows: U.S. patent application Ser. No. 09/829,409, entitled "Flat Float Glass," having attorney docket No. NHL-FMW-02A US (SCT), having inventors Dr. Friedrich SIEBERS, Dr. Peter NAβ, Dr. Gerhard LAUTENSCHLÄGER, and Dr. Otmar BECKER, filed on Apr. 9, 2001 is hereby incorporated by reference as if set forth in its entirety herein.

The following U.S. Patent Application is to be incorporated by reference as follows: U.S. patent application Ser. No. 09/828,287, entitled, "A Building for Containing Human Occupants in an Adverse Arctic or Antarctic Environment and Structures for Containing and Protecting Human Occupants in an Adverse Environment," having attorney docket No. NHL-FMW-03 US (SCT), having inventors Dr. Sabine MELSON and Stefan HUBERT, filed on Apr. 6, 2001 is hereby incorporated by reference as if set forth in its entirety herein.

The following U.S. Patent Application is to be incorporated by reference as follows: U.S. patent application Ser. No. 09/828,286, entitled, "Lamp with an Unpolished Surface and Radiant Source Lamps with a Transparent Cover for the Radiant Source," having attorney docket No. NHL-FMW-04 US (SCT), having inventors Dr. Sabine MELSON and Dr. Peter NAβ, filed on Apr. 6, 2001 is hereby incorporated by reference as if set forth in its entirety herein.

The following references: German Patent No. 30 49 491 C2; German Patent No. 42 27 672 C2; French Patent No. 2 626 964; European Patent No. 0 069 298 B1, having corresponding U.S. Pat. No. 4,527,050; and German Patent Application No. 197 05 715.2.-16, all relating to cooktops or stoves, and their published equivalents, are hereby incorporated by reference as if set forth in their entirety herein.

The thesis entitled, "Untersuchung der kristallchemischen Ursachen fuir die Umwandlung der Hochquarz- in Keatit-Mischkristalle in $Li_2O$—$Al_2O_3$—$SiO_2$-Glaskeramiken, [Investigation of the crystal-chemical reasons for the transformation of high quartz mixed crystals into keatite mixed crystals in $Li_2O$—$Al_2O_3$—$SiO_2$-glass ceramics]," by Christina Günter, 1992, 193 pages with illustrations, Darmstadt, Technische Hochschule, library access: DISS 95 A 6975, is hereby incorporated by reference as if set forth in its entirety herein.

The term DIN refers to the standards of the German Standards Association, Deutsches Institute fur Normung.

In accordance with one aspect, the invention relates to a transparent glass ceramic which can be utilized such as for a smooth-top cooktop, a stove with a smooth-top cooktop, a glass ceramic providing fire protection of a door or a window for a building, culinary ware, ovenware, direct oven-to-table cookware, and cookware and possibly cooking utensils, a glass ceramic pane to serve as a fire screen such as in a fireplace, or as a window for a self-cleaning oven.

Details concerning the LAB color system may possibly be found in the following references, U.S. Pat. No. 6,172,681; U.S. Pat. No. 5,652,582; and U.S. Pat. No. 4,349,634. These references are hereby incorporated as if set forth in their entirety herein.

All of the patent references and their published equivalents anywhere, and the references in which they are cited, are hereby incorporated as if set forth in their entirety herein.

All the ranges given herein, such as percent ranges, temperature ranges, residence time or hold time ranges, and distances, are to be understood to include within the range fractions in at least a tenth, or smaller, of steps such that any tenth may be a limit of a diminished range.

Thus, with respect to ranges, such as, for example, percent ranges, these are to be understood to include, within the range of percentages, steps of percentages in at least a tenth of a percent, or smaller, such that any tenth of a percent may be a limit of a diminished range of percentages.

Accordingly, with respect to temperature ranges, these are to be understood to include within the range of degrees, steps of degrees in at least a tenth of a degree, or smaller, such that any tenth of a degree may be a limit of a diminished range of degrees.

Thus, with respect to time ranges, these are to be understood to include within the range of hours, steps of hours in at least a tenth of an hour, or smaller, such that any tenth of an hour may be a limit of a diminished range of hours.

Accordingly, with respect to time ranges, these are to be understood to include within the range of minutes, steps of minutes in at least a tenth of a minute, or smaller, such that any tenth of a minute may be a limit of a diminished range of minutes.

Also, with respect to length ranges, these are to be understood to include within the range of micrometers, for example, steps of micrometers in at least a tenth of a micrometer, or smaller, such that any tenth of a micrometer may be a limit of a diminished range of micrometers.

Accordingly, with respect to length ranges, these are to be understood to include within the range of nanometers, for example, steps of nanometers in at least a tenth of a nanometer, or smaller, such that any tenth of a nanometer may be a limit of a diminished range of nanometers.

In accordance with one aspect of the invention, the layered structure of the glass ceramic may possibly be achieved by heating the inner layer, to produce keatite, and cooling, possibly by a cooling gas, of an outer surface, or both surfaces of the glass ceramic being produced, to produce or retain the high quartz phase or layer.

In other words, heating of the inner layer may possibly be accomplished around the periphery of the article under production while blowing a cooling gas at the surface that is to provide the outer layer to maintain the high quartz phase in the outer layer while producing keatite in the inner layer.

Thus, after hot forming of the glass material, the glass material is possibly cooled to below the inversion temperature. In other words, the material may be cooled to below the transformation temperature. The initial glass is then possibly transformed by controlled crystallization into a glass ceramic item. This ceramization possibly takes place in a multiple-stage temperature process, in which first by nucleation at a temperature possibly within the range of from approximately six hundred degrees Celsius to approximately eight hundred degrees Celsius embryonic nuclei or seeds, generally consisting of titanium dioxide or zirconium dioxide/titanium dioxide mixed crystals, are generated, although tin dioxide can possibly also participate in the nucleation. During the subsequent temperature increase, at the possible crystallization temperature within the range of from approximately seven hundred and fifty degrees Celsius to approximately nine hundred degrees Celsius, first high quartz mixed crystals form on these nuclei. As the temperature is increased further possibly to within the range of from approximately nine hundred degrees Celsius to approximately twelve hundred degrees Celsius, these high quartz mixed crystals are further transformed into keatite mixed crystals. The transformation into keatite mixed crystals is accompanied by a crystal growth, i.e. increasing crystallite size, as a result of which there is an increasing diffraction of light, i.e. the light transmission becomes less and less. The glass ceramic item thereby appears increasingly translucent and finally opaque.

Thus, under cooling of the outer layer or surface, possibly by a cooling gas, to maintain its high crystal phase or constitution, as the temperature is increased further possibly to be within the range of from approximately nine hundred degrees Celsius to approximately twelve hundred degrees Celsius, the inner surface or layer of high quartz mixed crystals is further transformed into keatite mixed crystals as the inner layer or core that has been subjected to a temperature which is greater, or in excess of, than the temperature to which the outer layer has been subjected to during ceramization. As mentioned, the transformation into keatite mixed crystals of the inner layers, under cooling of the outer layer, is accompanied by a crystal growth, i.e. increasing crystallite or grain size, as a result of which there is an increasing diffraction of light, i.e. the light transmission is diminished. The glass ceramic item thereby appears increasingly translucent and finally opaque.

In other words it is within the scope of the invention that the item to be ceramized is heated from the side to provide a portion high in keatite in the inner layer while cooling the outer portion or layer to maintain the high quartz layer in such outer portion. Undesired portions may be trimmed away.

In accordance with one aspect of the invention, the layered structure of the glass ceramic may possibly be achieved by heating the inner layer, to produce keatite, and cooling, possibly by a cooling gas, of an outer surface, or both surfaces of the glass ceramic being produced, to produce high quartz.

In other words, heating of the inner layer may possibly be accomplished around the periphery of the article under production while blowing a cooling gas at the surface that is to provide the outer layer to maintain the high quartz phase while producing in the inner layer keatite.

Other methods, as suggested in the prior art may be used or derived to obtain the layered structure comprising a surface layer of high quartz and an inner layer comprised of keatite.

Some examples of layered structures, features of which may possibly be used or possibly adapted for use in a possible embodiment of the present invention may be found in the following U.S. patents: U.S. Pat. No. 4,004,183; U.S. Pat. No. 4,074,992; U.S. Pat. No. 4,074,993; U.S. Pat. No. 4,083,727; and U.S. Pat. No. 4,084,972. These patents are hereby incorporated by reference as if set forth in their entirety herein.

It is also within the scope of the invention to provide a glass ceramic which comprises areas or portion at the surface that are comprised of keatite.

Thus, after hot forming, the glass material is possibly cooled to below the inversion temperature. In other words, the material may be cooled to below the transformation temperature. The initial glass is then possibly transformed by controlled crystallization into a glass ceramic item. This ceramization possibly takes place in a multiple-stage temperature process, in which first by nucleation at a temperature possibly within the range of from approximately six hundred degrees Celsius to approximately eight hundred degrees Celsius embryonic nuclei or seeds, generally consisting of titanium dioxide or zirconium dioxide/titanium dioxide mixed crystals, are generated, although tin dioxide can possibly also participate in the nucleation. During the subsequent temperature increase, at the possible crystallization temperature within the range of from approximately seven hundred and fifty degrees Celsius to approximately nine hundred degrees Celsius, first high quartz mixed crystals form on these nuclei. As the temperature is increased further possibly to within the range of from approximately nine hundred degrees Celsius to approximately twelve hundred degrees Celsius, these high quartz mixed crystals are further transformed into keatite mixed crystals. The transformation into keatite mixed crystals is accompanied by a crystal growth, i.e. increasing crystallite size, as a result of which there is an increasing diffraction of light, i.e. the light transmission becomes less and less. The glass ceramic item thereby appears increasingly translucent and finally opaque.

Thus, under selective cooling of the outer layer or surface, possibly by a cooling gas, in areas or portions which are to retain high quartz phase constitution, as the temperature is increased further possibly to be within the range of from approximately nine hundred degrees Celsius to approximately twelve hundred degrees Celsius, the inner surface or layer high quartz mixed crystals are further transformed into keatite mixed crystals as the inner layer or core that has been subjected to a temperature which is greater, or in excess of, than the temperature to which the outer layer has been subject during ceramization. Keatite may also be formed in surface portions not cooled, such surface portions providing areas for controls and the like devices. Such portions are adjacent to portions that have retained the high quartz phase. As mentioned, the transformation into keatite mixed crystals of the inner layers, under selective cooling of the outer layer, is accompanied by a crystal growth, i.e. increasing crystallite or grain size, as a result of which there is an increasing diffraction of light, i.e. the light transmission is diminished. The glass ceramic item thereby appears increasingly translucent and finally opaque.

In other words it is within the scope of the invention that the item to be ceramized is heated to provide a portion high in keatite in the inner layer and in surface portions not cooled in selective manner. The selectively cooled portions or layers, cooled to maintain the high quartz layer, in such outer portions may provide the heating portions, i.e., the portions where the heating elements are situated in the assembly, in a smooth-top glass ceramic cooktop.

In accordance with a further aspect of the invention, there is provided a glass ceramic in translucent or opaque form as one of: a cooktop, and cookware; and in transparent form as one of: fire protective panes, fireplace screens, cookware, and windows for self-cleaning ovens.

The following U.S. Patents are to be incorporated by reference herein as follows: U.S. Pat. No. 6,021,774, having inventors Taplan et al., issued on Feb. 8, 2000; U.S. Pat. No. 6,148,812, having inventors Taplan et al., issued on Nov. 21, 2000; U.S. Pat. No. 6,002,112, having inventors NAB et al., issued on Dec. 14, 1999; U.S. Pat. No. 6,111,229, having inventor Schultheis, issued on Aug. 29, 2000; U.S. Pat. No. 6,050,176, having inventors Schultheis et al., issued on Apr. 18, 2000; and U.S. Pat. No. 6,236,024, having inventors Gotz et al., issued on May 22, 2001, are hereby incorporated by reference as if set forth in their entirety herein.

The following U.S. Patent Application is to be incorporated by reference as follows: U.S. patent application Ser. No. 09/522,460, entitled, "Cooking unit, such as a stove, for cooking food," having inventors Dipl.-Ing. Michael MUSKALLA, Keramik-Ing. Werner HOTTUM, and Dipl.-Ing. Bernd SCHULTHEIS, filed on Mar. 9, 2000 is hereby incorporated by reference as if set forth in its entirety herein.

A further foreign patent publication application, namely, Federal Republic of Germany Patent Application No. DE 199 10 467.0-16, corresponding to the U.S. application mentioned in the immediately preceding paragraph, filed on Mar. 10, 1999, having inventors Dipl.-Ing. Michael MUSKALLA, Keramik-Ing. Werner HOTTUM, and Dipl.-Ing. Bernd SCHULTHEIS, and DE-OS 199 10 467.0-16 and DE-PS 199 10 467.0-16, as well as their published equivalents, and other equivalents or corresponding applications, if any, in corresponding cases in the Federal Republic of Germany and elsewhere, and the references cited in any of the documents cited herein, are hereby incorporated by reference as if set forth in their entirety herein.

The following U.S. Patent Application is to be incorporated by reference as follows: U.S. patent application Ser. No. 09/758,953, entitled, "Stove or grill for cooking, and stove or grill for cooking having a glass ceramic cooktop or hob, and a glass ceramic plate cooktop or hob for use in a stove or grill," having having inventors Ioannis KOSMAS, Dietmar WENNEMANN, and Joachim GRUTZKE, filed on Jan. 11, 2001 is hereby incorporated by reference as if set forth in its entirety herein.

A further foreign patent publication application, namely, Federal Republic of Germany Patent Application No. DE 100 00 657. 4–16, corresponding to the U.S. Patent Application referred to in the immediately preceding paragraph, filed on Jan. 11, 2001, having inventors Ioannis KOSMAS, Dietmar WENNEMANN, and Joachim GRUTZKE, entitled, "Glaskeramikplatte," and DE-OS 100 00 657 and DE-PS 100 00 657, as well as their published equivalents, and other equivalents or corresponding applications, if any, in corresponding cases in the Federal Republic of Germany and elsewhere, and the references cited in any of the documents cited herein, are hereby incorporated by reference as if set forth in their entirety herein.

The following U.S. Patent Application is to be incorporated by reference as follows: U.S. patent application Ser. No. 09/866,989, entitled, "Method of treating a smooth-top kitchen ceramic or glass ceramic cooktop cooking surface of a smooth-top kitchen ceramic or glass ceramic cooktop or a stove having a ceramic or glass ceramic cooktop cooking surface, and a device therefor," having inventors Bernd SCHULTHEIS and Monica DE WITZMANN, filed on May 29, 2001 is hereby incorporated by reference as if set forth in its entirety herein.

A further foreign patent publication application, namely, Federal Republic of Germany Patent Application No. DE 100 26 824. 2–15, corresponding to the U.S. Patent Application referred to in the immediately preceding paragraph, filed on May 30, 2000, having inventors Bernd SCHULTHEIS and Monica DE WITZMANN, entitled, "Reinigungsschaber," and DE-OS 100 26 824 and DE-PS 100 26 824, as well as their published equivalents, and other equivalents or corresponding applications, if any, in corresponding cases in the Federal Republic of Germany and elsewhere, and the references cited in any of the documents cited herein, are hereby incorporated by reference as if set forth in their entirety herein.

The following U.S. Patents being of interest in connection with cooktops are to be incorporated by reference herein as follows: U.S. Pat. No. 6,024,084, having inventor Gerhardinger, issued on Feb. 15, 2000, entitled, "Double sided heat barrier glass with clear CVD coating and method of making the same"; U.S. Pat. No. 5,958,272, having inventors Taplan et al., issued on Sep. 28, 1999, entitled, "Cooktop with a glass or glass ceramic cooking surface"; and U.S. Pat. No. 4,413,171, having inventor Klammers, issued on Nov. 1, 1983, entitled, "Electric cooking oven for domestic use," are hereby incorporated by reference as if set forth in their entirety herein.

Some examples of stoves and ranges which may possibly be utilized or possibly adapted for use in at least one possible embodiment of the present invention may be found in the following U.S. patents: U.S. Pat. No. 5,083,010, having inventors Henry et al., issued on Jan. 21, 1992; U.S. Pat. No. 4,601,279, having inventor Guerin, issued on Jul. 22, 1986; U.S. Pat. No. 4,493,976, having inventor Wilson, issued on Jan. 15, 1985; U.S. Pat. No. 4,292,501, having inventor Maitenaz, issued on Sep. 29, 1981; U.S. Pat. No. 5,213,091, issued on May 25, 1993; U.S. Pat. No. D336,210, issued on Jun. 8, 1993; U.S. Pat. No. 5,280,152, issued on Jan. 18, 1994; U.S. Pat. No. 5,290,997, issued on Mar. 1, 1994; U.S. Pat. No. 5,400,765, issued on Mar. 28, 1995; U.S. Pat. No.

D359,345, issued on Jun. 13, 1995; U.S. Pat. No. D361,015, issued on Aug. 8, 1995; and U.S. Pat. No. 5,464,005, issued on Nov. 7, 1995. The aforementioned patents are hereby incorporated by reference as if set forth in their entirety herein.

Some examples of burners and related components which may possibly be utilized or possibly adapted for use in at least one possible embodiment of the present invention may be found in the following U.S. patents: U.S. Pat. No. 4,758,710, issued on Jul. 19, 1988; U.S. Pat. No. 4,899,723, issued on Feb. 13, 1990; U.S. Pat. No. 5,186,158, issued on Feb. 16, 1993; U.S. Pat. No. D333,943, issued on Mar. 16, 1993; U.S. Pat. No. 5,323,759, issued on Jun. 28, 1994; U.S. Pat. No. 5,329,918, issued on Jul. 19, 1994; U.S. Pat. No. 5,397,234, issued on Mar. 14, 1995; U.S. Pat. No. 5,397,873, issued on Mar. 14, 1995; U.S. Pat. No. 5,400,765, issued on Mar. 28, 1995; and U.S. Pat. No. 5,437,262, issued on Aug. 1, 1995. The aforementioned patents are hereby incorporated by reference as if set forth in their entirety herein.

Some examples of related components for stoves and ranges which may possibly be utilized or possibly adapted for use in at least one possible embodiment of the present invention may be found in the following U.S. patents: U.S. Pat. No. 5,220,155, issued on Jun. 15, 1993; U.S. Pat. No. 5,245,159, issued on Sep. 14, 1993; U.S. Pat. No. 5,343,020, issued on Aug. 30, 1994; U.S. Pat. No. 5,377,660, issued on Jan. 3, 1995; U.S. Pat. No. 5,380,985, issued on Jan. 10, 1995; and U.S. Pat. No. 5,400,766, issued on Mar. 28, 1995. The aforementioned patents are hereby incorporated by reference as if set forth in their entirety herein.

Some examples of cooking hobs and cooktops which may possibly be utilized or possibly adapted for use in at least one possible embodiment of the present invention may be found in the following U.S. patents: U.S. Pat. No. 5,406,932, issued on Apr. 18, 1995; U.S. Pat. No. 5,422,460, issued on Jun. 6, 1995; U.S. Pat. No. 5,424,512, issued on Jun. 13, 1995; U.S. Pat. No. 5,425,353, issued on Jun. 20, 1995; U.S. Pat. No. 5,429,114, issued on Jul. 4, 1995; and U.S. Pat. No. 5,448,036, issued on Sep. 5, 1995. The aforementioned patents are hereby incorporated by reference as if set forth in their entirety herein.

Some examples of ceramic plates or hot plates which may be possibly utilized or possibly adapted for use in at least one possible embodiment of the present invention may be found in the following U.S. patents: U.S. Pat. No. 3,596,650, issued on Aug. 3, 1971; U.S. Pat. No. 3,870,861, issued on Mar. 11, 1975; U.S. Pat. No. 4,414,465, issued on Nov. 8, 1983; U.S. Pat. No. 4,634,841, issued on Jan. 6, 1987; and U.S. Pat. No. 5,397,873, issued on Mar. 14, 1995. The aforementioned patents are hereby incorporated by reference as if set forth in their entirety herein.

Some examples of resistors printed on or disposed on a ceramic material which may possibly be utilized or possibly adapted for use in at least one possible embodiment of the present invention may be found in the following U.S. patents: U.S. Pat. No. 4,004,130, issued on Jan. 18, 1977; U.S. Pat. No. 4,160,897, issued on Jul. 10, 1979; U.S. Pat. No. 4,762,982, issued on Aug. 9, 1988; U.S. Pat. No. 5,264,681, issued on Nov. 23, 1993; and U.S. Pat. No. 5,700,338, issued on Dec. 23, 1997. The aforementioned patents are hereby incorporated by reference as if set forth in their entirety herein.

Some examples of ceramic materials which may possibly be utilized or possibly adapted for use in at least one possible embodiment of the present invention may be found in the following U.S. patents: U.S. Pat. No. 5,385,873, issued on Jan. 31, 1995; U.S. Pat. No. 5,407,740, issued on Apr. 18, 1995; U.S. Pat. No. 5,420,399, issued on May 30, 1995; U.S. Pat. No. 5,422,319, issued on Jun. 6, 1995; U.S. Pat. No. 5,449,649, issued on Sep. 12, 1995; U.S. Pat. No. 5,476,684, issued on Dec. 19, 1995; and U.S. Pat. No. 5,691,261, issued on Nov. 25, 1997. The aforementioned patents are hereby incorporated by reference as if set forth in their entirety herein.

Some examples of adhesive materials which may possibly be utilized or possibly adapted for use in at least one possible embodiment of the present invention may be found in the following U.S. patents: U.S. Pat. No. 5,225,662, issued on Jul. 6, 1993; U.S. Pat. No. 5,268,338, issued on Dec. 7, 1993; U.S. Pat. No. 5,288,674, issued on Feb. 22, 1994; U.S. Pat. No. 5,300,627, issued on Apr. 5, 1994; U.S. Pat. No. 5,403,228, issued on Apr. 4, 1995; U.S. Pat. No. 5,432,320, issued on Jul. 11, 1995; U.S. Pat. No. 5,468,290, issued on Nov. 21, 1995; and U.S. Pat. No. 5,475,044, issued on Dec. 12, 1995. The aforementioned patents are hereby incorporated by reference as if set forth in their entirety herein.

Some examples of float glass and/or glass ceramics that may possibly be utilized or possibly adapted for use in at least one possible embodiment of the present invention may be found in the following U.S. patents: U.S. Pat. No. 6,143,417, having inventors Nomura et al., issued on Nov. 7, 2000; U.S. Pat. No. 6,065,309, having inventors Cooper et al., issued on May 23, 2000; U.S. Pat. No. 5,723,172, having inventor Sherman, issued on Mar. 3, 1998; U.S. Pat. No. 5,846,279, having inventors Nomura et al., issued on Dec. 8, 1998; U.S. Pat. No. 5,665,424, having inventor Sherman, issued on Sep. 9, 1997; and U.S. Pat. No. 4,859,636, having inventors Aratani et al., issued on Aug. 22, 1989. The aforementioned patents are hereby incorporated by reference as if set forth in their entirety herein.

Some examples of flat glass production which may possibly be incorporated in a possible embodiment or example of the present invention may be found in U.S. Pat. No. 3,218,143 issued to De Lajarte on Nov. 16, 1965 and entitled "Process for the manufacture of flat glass"; U.S. Pat. No. 3,930,826 issued to Schornhorst on Jan. 6, 1976 and entitled "Conditioning flat glass for removal from supporting liquid following forming"; U.S. Pat. No. 3,938,979 issued to Plumat on Feb. 147, 1976 and entitled "Method and apparatus for vertically drawing a glass ribbon"; U.S. Pat. No. 4,801,321 issued to Pita et al. on Jan. 31, 1989 and entitled "Method for the manufacturing of glass sheets"; U.S. Pat. No. 4,214,886 issued to Shay et al. on Jul. 29, 1980 and entitled "Forming laminated sheet glass"; U.S. Pat. No. 4,209,315 issued to Spurling on Jun. 24, 1980 and entitled "Glass forming apparatus"; U.S. Pat. No. 4,929,266 issued to Cozac et al. on May 29, 1990 and entitled "Method of manufacturing glass"; and U.S. Pat. No. 5,078,777 issued to Cozac et al. on Jan. 7, 1992 and entitled "Glass-melting furnace", all of these U.S. patents being hereby expressly incorporated by reference as if set forth in their entirety herein.

Some examples relating to aluminosilicate, features of which may possibly be incorporated in an embodiment of the present invention may be found in U.S. Pat. No. 4,084,974 issued to Beall et al. on Apr. 18, 1978 and entitled "Method of making light-absorbing glass-ceramic articles"; U.S. Pat. No. 4,530,909 issued to Makishima et al. on Jul. 23, 1985 and entitled "Aluminosilicate glass containing $Y_2O_3$ concentrate and $ZRO_2$"; U.S. Pat. No. 4,626,515 issued to Chyung et al. on Dec. 2, 1986 and entitled "Reinforced alkaline earth aluminosilicate glasses"; U.S. Pat. No. 4,846,866 issued to Chyung et al. on Jul. 11, 1989 and entitled "Providing reinforced alkaline earth aluminosilicate glasses"; and U.S. Pat. No. 6,060,168 issued to Kohli on May 9, 2000 and entitled "Glasses for display panels and photovoltaic devices", all of these U.S. patents being hereby expressly incorporated by reference as if set forth in their entirety herein.

Some examples relating to float glass processes, features of which may possibly be incorporated in a possible embodiment of the present invention may be found in U.S. Pat. No. 4,305,745 issued to Mouly on Dec. 15, 1981 and entitled "Method of attenuating glass in a float process"; U.S. Pat. No. 4,342,583 issued to Kapura et al. on Aug. 3, 1982 and entitled "Apparatus and method for attenuating floating glass ribbon"; U.S. Pat. No. 4,357,156 issued to Seymour on Nov. 2, 1982 and entitled "Minimizing surface distortion while shaping glass sheets"; U.S. Pat. No. 4,402,722 issued to Edge on Sep. 6, 1983 and entitled "Cooling arrangement and method for forming float glass"; U.S. Pat. No. 4,741,7540 issued to Bricker on May 3, 1988 and entitled "Method an apparatus for cooling in a float glass forming operation"; and U.S. Pat. No. 5,643,349 issued to Piper et al on Jul. 1, 1997 and entitled "Apparatus for applying $SO_3$ to float glass", all of these U.S. patents being hereby expressly incorporated by reference as if set forth in their entirety herein.

Some examples of keatite and/or high quartz mixed crystal formation, features of which may possibly be incorporated in a possible embodiment of the present invention may be found in the following U.S. patents: U.S. Pat. No. 3,938,978 issued to Hummel on Feb. 17, 1976 and entitled, "Method of making crystallized glass," U.S. Pat. No. 3,970,463 issued to Planchock et al. on Jul. 20, 1976 and entitled, "Glasses and glass-ceramics and products made therefrom," U.S. Pat. No. 4,011,091 issued to McCollister on Mar. 8, 1977 and entitled, "Ceramic materials containing keatite," U.S. Pat. No. 4,100,001 issued to Franklin on Jul. 11, 1978 and entitled, "Thermally crystallizable glasses and glass-ceramics made therefrom," U.S. Pat. No. 4,391,914 issued to Beall et al. on Jul. 5, 1983 and entitled, "Strengthened glass-ceramic articles and method," U.S. Pat. No. 4,861,734 issued to MacDowell on Aug. 29, 1989 and entitled, "Alkaline earth aluminoborate glass-ceramics," U.S. Pat. No. 5,212,122 issued to Pannhorst et al. on may 18, 1993 and entitled, "Transparent colored glass ceramic with good thermal stability and variable transmission in the IR region," and U.S. Pat. No. 6,043,171 issued to Siebers et al. on Mar. 28, 2000 and entitled, "Lead-free and cadmium-free glass compositions for glazing, enamelling and decorating glass of glass-ceramics," all of these U.S. patents being hereby expressly incorporated by reference as if set forth in their entirety herein.

Some examples of ceramizing or ceramising glass-ceramic or glass, features of which may possibly be incorporated in a possible embodiment of the present invention may be found in U.S. Pat. No. 4,824,463 issued to Neuhoff et al. on Apr. 25, 1989 and entitled "Process for ceramising glass-ceramic sheets"; and U.S. Pat. No. 4,851,022 issued to Günthner on Jul. 25, 1989 and entitled "Method and oven for ceramising glass plates", all of these U.S. patents being hereby expressly incorporated by reference as if set forth in their entirety herein.

Some examples of crystallizable glass and glass-ceramics made therefrom, features of which may possibly be incorporated in a possible embodiment of the present invention may be found in U.S. Pat. No. 3,970,463 issued to Planchock et al. on Jul. 20, 1976 and entitled "Glasses and glass-ceramics and products made therefrom"; U.S. Pat. No. 4,011,091 issued to McCollister on march 8, 1977 and entitled "Ceramic materials containing keatite"; U.S. Pat. No. 4,100,001 issued to Franklin on Jul. 11, 1978 and entitled "Thermally crystallizable glasses and glass-ceramics made therefrom"; U.S. Pat. No. 4,126,476 issued to Grossman on Nov. 21, 1978 and entitled "Aluminous quartz ceramics and method"; U.S. Pat. No. 4,391,914 issued to Beall et al. on Jul. 5, 1983 and entitled "Strengthened glass-ceramic article and method"; U.S. Pat. No. 6,197,710 B1 issued to Ōhara et al. on Mar. 6, 2001 and entitled "Luminous glass ceramics"; and U.S. Pat. No. 6,204,211 B1 issued to Ōhara et al. on Mar. 20, 2001 and entitled "Luminous glass ceramics", all of these U.S. patents being hereby expressly incorporated by reference as if set forth in their entirety herein.

The following U.S. Patents, also mentioned above, and their published equivalents, are hereby incorporated by reference as if set forth in their entirety herein as follows: U.S. Pat. No. 4,211,820 issued to Cantaloupe et al. on Jul. 8, 1980 and entitled, "Brown glass-ceramic articles," U.S. Pat. No. 4,218,512 issued to Allersma on Aug. 19, 1980 and entitled, "Strengthened translucent glass-ceramics and method of making," U.S. Pat. No. 5,070,045 issued to Comte et al. on Dec. 3, 1991 and entitled, "Transparent glass-ceramic article," and U.S. Pat. No. 5,173,453 issued to Beall et al. on Dec. 22, 1992 and entitled, "Variably translucent articles and method for making."

The following foreign reference, also mentioned above, and its published equivalents, are hereby incorporated by reference as if set forth in its entirety herein as follows: WO 99/06334 to EUROKERA with international publication date of Feb. 11, 1999, and entitled, "Glass-ceramic plate and method for making same."

The following U.S. patents, and their published equivalents, relating to keatite mixed-crystals and/or high-quartz mixed-crystals are hereby incorporated by reference as if set forth int heir entirety herein, as follows: U.S. Pat. No. 5,446,008 issued to Krolla et al. on Aug. 29, 1995 and entitled, "Transparent or translucent inorganic material with high transmission in the 2700–3300 nm wavelength range," and U.S. Pat. No. 5,922,271 issued to Semar et al. on Jul. 13, 1999 and entitled, "Method for the manufacture of dense-sintered glass ceramic moldings."

The following foreign references, and their published equivalents, referring to keatite mixed crystals and/or high-quartz mixed crystals are hereby incorporated by reference as if set forth in their entirety herein as follows: Federal Republic of Germany Laid-open Patent Publication No. DE 199 39 787 A1 of SCHOTT GLAS and filed on Aug. 21, 1999; Federal Republic of Germany Laid-open Patent Application No. DE 199 07 038 A1 of SCHOTT GLAS and filed on Feb. 19, 1999; Federal Republic of Germany Laid-open Patent Publication No. DE 199 20 493 A1 of SCHOTT GLAS and filed on May 5, 1999; Federal Republic of Germany Laid-open Patent Publication No. DE 198 57 117 A1 of SCHOTT GLAS and filed on Dec. 10, 1998; Federal Republic of Germany Pat. No. DE 196 43 231 C2 to SCHOTT GLAS and issued on Dec. 10, 1998.

The following U.S. patents, referring to temperature difference consideration in accordance with aspects of the invention, and the published equivalents of such patents, are hereby incorporated by reference as if set forth in their entirety herein: U.S. Pat. No. 5,763,343 issued to Brix et al. on Jun. 9, 1998 and entitled, "Fire regardant safety glass," U.S. Pat. No. 5,876,472 issued to Gros et al. on Mar. 2, 1999 and entitled, "Method for producing a chemically pretensioned glass body," U.S. Pat. No. 5,990,023 issued to Siedel et al. on Nov. 23, 1999 and entitled, "Fire-resistant glazing," U.S. Pat. No. 6,096,670 issued to Lautenschlager et al. on Aug. 1, 2000 and entitled, "Alkali metal-free aluminoborosilicate glass and its use," and U.S. Pat. No. 6,187,429 issued to Weinberg et al. on Feb. 13, 2001 and entitled, "Decorative ceramic color layers applied to glass or glass ceramic."

The following foreign references, referring to temperature difference resistance or temperature difference resiliency, and their published equivalents, are hereby incorporated by reference as if set forth in their entirety herein: Federal Republic of Germany Pat. No. DE 199 34 072 C2 to SCHOTT GLAS and issued on Jun. 13, 2001; Federal Republic of Germany Pat. No. DE 198 57 117 C2 issued to SCHOTT GLAS on May 3, 2001; and Federal Republic of Germany Patent No. 42 44 048 C2 issued to FRICKE on Aug. 8, 1996.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims. In the claims, means-plus-function clauses are intended to cover the structures described herein as performing the recited function and not only structural equivalents but also equivalent structures.

The invention as described herein above in the context of the preferred embodiments is not to be taken as limited to all of the provided details thereof, since modifications and variations thereof may be made without departing from the spirit and scope of the invention.

What is claimed is:

1. A stove, with a smooth-top cooktop, for cooking food, said stove comprising:

a stove body;

said stove body being configured with a support comprising feet;

a smooth-top cooktop to cook food thereon;

an arrangement to attach said smooth-top cooktop to said stove body;

said smooth-top cooktop comprising a layer which becomes an upper layer upon installation in a kitchen;

said smooth-top cooktop comprising a cooking surface configured to cook food;

said cooking surface being disposed at or adjacent to said upper layer of said smooth-top cooktop;

said cooking surface, at or adjacent to said upper layer of said smooth-top cooktop, being configured to receive a bottom of a cooking vessel to cook food therein;

at least one heat source;

said at least one heat source being configured to heat said cooking surface to thereby cook food;

said at least one heat source being disposed adjacent to said cooking surface;

control apparatus being configured and disposed to control said smooth-top cooktop;

said control apparatus being connected to control said at least one heat source and thus to control heat;

said smooth-top cooktop comprising a glass ceramic body;

said cooking surface being disposed adjacent to or comprising a part of said glass ceramic body;

said glass ceramic body comprising:

a crystallized and ceramicized glass;

an interior portion;

an exterior surface;

a first glass ceramic region and a second glass ceramic region;

said first glass ceramic region being disposed within said interior portion of said glass ceramic body;

said second glass ceramic region being disposed between said exterior surface and said first glass ceramic region;

said glass ceramic body comprising glass ceramic continuously from within said first glass ceramic region to within said second glass ceramic region;

said first glass ceramic region comprising, at least predominantly, a first glass ceramic material;

said second glass ceramic region comprising, at least predominantly, a second glass ceramic material;

said first glass ceramic material comprising a chemically different glass ceramic material than said second glass ceramic material;

said second glass ceramic region of said glass ceramic body being configured to minimize surface defects;

said surface defects comprising at least one of: fissures, cracks, pits, and pores; and said first glass ceramic region of said glass ceramic body being configured to provide resistance to impact to said second glass ceramic region from cooking utensils being dropped onto said second glass ceramic region of said smooth-top cooktop.

2. The stove, with a smooth-top cooktop, according to claim 1, wherein:

said second glass ceramic region of said glass ceramic body comprises a coefficient of thermal expansion which is less than the coefficient of thermal expansion of said first glass ceramic region of said glass ceramic body to minimize surface defects and also to maximize impact resistance of said glass ceramic body.

3. The stove, with a smooth-top cooktop, according to claim 2, wherein:

said cooking surface comprises a glassy layer, disposed at or adjacent to said second glass ceramic region of said smooth-top cooktop, to provide said cooking surface.

4. The stove according to claim 1, wherein:

said glass ceramic body comprises one of (a.) and (b.):

(a.) translucent glass ceramic; and (b.) opaque glass ceramic; and said glass ceramic body having:

(A.) a light transmissivity in the visible range of 0.5 to 10% for a 4 millimeters specimen thickness;

(B.) an ability to withstand a temperature of more than 650 degrees Celsius;

(C.) keatite mixed crystals as the predominant crystal phase of said first glass ceramic material of said glass ceramic body;

(D.) high quartz mixed crystals as the predominant crystal phase of said second glass ceramic material of said glass ceramic body;

(E.) a coefficient of thermal expansion of said high quartz mixed crystals which is less than that of said keatite mixed crystals, to minimize surface defects of said exterior surface that reduce strength; and (F.) a $SiO_2$ content of said high quartz mixed crystals that is less than 80 weight %; and a minimized transformation of said high quartz mixed crystals into low quartz crystals to minimize cracks in said exterior surface.

5. The stove according to claim 4, wherein at least one of:
(i.) said glass ceramic body having an ability to withstand a temperature of more than 700 degrees Celsius;
(ii.) said glass ceramic body comprises a plate structure;
(iii.) said glass ceramic body comprises a composition in weight percent, on an oxide basis, of:

| | |
|---|---|
| $LiO_2$ | 3.0 to 4.0 |
| $Na_2O$ | 0 to 1.0 |
| $K_2O$ | 0 to 0.6 |
| S $Na_2O+K_2O$ | 0.2 to 1.0 |
| MgO | 0 to 1.5 |
| CaO | 0 to 0.5 |
| SrO | 0 to 1.0 |
| BaO | 0 to 2.5 |
| S CaO+SrO+BaO | 0.2 to 3.0 |
| ZnO | 1.0 to 2.2 |
| $Al_2O_3$ | more than 19.8 to 23 |
| $SiO_2$ | 66 to 70 |
| $TiO_2$ | 2.0 to 3.0 |
| $ZrO_2$ | 0.5 to 2.0 |
| $P_2O_5$ | 0 to 1.0 | and at least one fining agent comprising: $As_2O_3$, $Sb_2O_3$, $SnO_2$, $CeO_2$ and sulfate compounds and chloride compounds;
(iv.) said glass ceramic body comprises a layer being disposed on said exterior surface and adjacent said second glass ceramic region;
said layer comprising a vitreous layer;
(v.) said glass ceramic body comprises a layer being disposed on said exterior surface and adjacent said second glass ceramic region;
said layer comprising a vitreous layer;
said vitreous layer comprising a substantial content of at least one of: $Na_2O$, $K_2O$, CaO, SrO, and BaO, to protect said second glass ceramic region against acids;
(vi.) said glass ceramic body comprises a layer being disposed on said exterior surface and adjacent said second glass ceramic region;
said layer comprising a vitreous layer;
said vitreous layer has a thickness of 100 to 600 nanometers;
(vii.) said second glass ceramic region, comprising high quartz mixed crystals, has a thickness of from 0.1 to 2.0 micrometers;
(viii.) said keatite mixed crystals comprise crystals having an average grain size of one of: from 0.3 to 2 micrometers, and from 1 to 1.5 micrometers;
(ix.) said glass ceramic body has a coefficient of thermal expansion, between room temperature and 700 degrees Celsius, that is one of: less than 1.3 millionths per degree Kelvin, and less than 1.1 millionths per degree Kelvin; and
(x.) said glass ceramic body comprises glass ceramic having a white value in the LAB System of L* greater than 83.

6. A glass ceramic, such as in a smooth-top cooktop, a stove with a smooth-top cooktop, a glass ceramic providing fire protection of a door or a window for a building, culinary ware, ovenware, direct oven-to-table cookware, and cookware, a glass ceramic pane to serve as a fire screen such as in a fireplace, or as a window for a self-cleaning oven, said glass ceramic comprising:

a glass ceramic body;
said glass ceramic body comprising:
a crystallized and ceramicized glass;
an interior portion;
an exterior surface;
a first glass ceramic region and a second glass ceramic region;
said first glass ceramic region being disposed within said interior portion of said glass ceramic body;
said second glass ceramic region being disposed between said exterior surface and said first glass ceramic region;
said glass ceramic body comprising glass ceramic continuously from within said first glass ceramic region to within said second glass ceramic region;
said first glass ceramic region comprising, at least predominantly, a first glass ceramic material;
said second glass ceramic region comprising, at least predominantly, a second glass ceramic material;
said first glass ceramic material comprising a chemically different glass ceramic material than said second glass ceramic material; and
said inner region being configured to provide resistance to impact to said outer region.

7. The glass ceramic body according to claim 6, wherein:
said glass ceramic body comprises one of (a.) and (b.):
(a.) translucent glass ceramic; and
(b.) opaque glass ceramic; and
said glass ceramic body having:
(A.) a light transmissivity in the visible range of 0.5 to 10% for a 4 millimeters specimen thickness;
(B.) an impact strength of more than 18 centimeters drop ball impact strength on average, tested with a 200 grams steel ball in a ball drop test;
(C.) an ability to withstand temperature differences of more than 650 degrees Celsius;
(D.) keatite mixed crystals as the predominant crystal phase of said first glass ceramic material of said glass ceramic body;
(E.) high quartz mixed crystals as the predominant crystal phase of said second glass ceramic material of said glass ceramic body;
(F.) a coefficient of thermal expansion of said high quartz mixed crystals which is less than that of said keatite mixed crystals, to minimize surface defects of said exterior surface that reduce strength; and
(G.) a $SiO_2$ content of said high quartz mixed crystals that is less than 80 weight %; and a minimized transformation of said high quartz mixed crystals into low quartz crystals to minimize cracks in said exterior surface.

8. The glass ceramic body according to claim 7, comprising at least one of:
(i.) said glass ceramic body having an ability to withstand temperature differences of more than 700 degrees Celsius;
(ii.) said glass ceramic body comprises a plate structure;
(iii.) said glass ceramic body comprises a composition in weight percent, on an oxide basis, of:

| | |
|---|---|
| $LiO_2$ | 3.0 to 4.0 |
| $Na_2O$ | 0 to 1.0 |

-continued

| | |
|---|---|
| $K_2O$ | 0 to 0.6 |
| S $Na_2O+K_2O$ | 0.2 to 1.0 |
| MgO | 0 to 1.5 |
| CaO | 0 to 0.5 |
| SrO | 0 to 1.0 |
| BaO | 0 to 2.5 |
| S CaO+SrO+BaO | 0.2 to 3.0 |
| ZnO | 1.0 to 2.2 |
| $Al_2O_3$ | more than 19.8 to 23 |
| $SiO_2$ | 66 to 70 |
| $TiO_2$ | 2.0 to 3.0 |
| $ZrO_2$ | 0.5 to 2.0 |
| $P_2O_5$ | 0 to 1.0 | and at least one fining agent comprising: $As_2O_3$, $Sb_2O_3$, $SnO_2$, $CeO_2$ and sulfate compounds and chloride compounds;

(iv.) said glass ceramic body comprises a layer being disposed on said exterior surface and adjacent said second glass ceramic region;
said layer comprising a vitreous layer;

(v.) said glass ceramic body comprises a layer being disposed on said exterior surface and adjacent said second glass ceramic region;
said layer comprising a vitreous layer;
said vitreous layer comprising a substantial content of at least one of: $Na_2O$, $K_2O$, CaO, SrO, and BaO, to protect said second glass ceramic region against acids;

(vi.) said glass ceramic body comprises a layer being disposed on said exterior surface and adjacent said second glass ceramic region;
said layer comprising a vitreous layer;
said vitreous layer has a thickness of 100 to 600 nanometers;

(vii.) said second glass ceramic region, comprising high quartz mixed crystals, has a thickness of from 0.1 to 2.0 micrometers;

(viii.) said keatite mixed crystals comprise crystals having an average grain size of one of: from 0.3 to 2 micrometers, and from 1 to 1.5 micrometers;

(ix.) said glass ceramic body has a coefficient of thermal expansion, between room temperature and 700 degrees Celsius, that is one of: less than 1.3 millionths per degree Kelvin, and less than 1.1 millionths per degree Kelvin; and (x.) said glass ceramic body comprises glass ceramic having a white value in the LAB System of L* greater than 83.

9. The glass ceramic body according to claim 7, comprising all of:

(i.) said glass ceramic body having an ability to withstand temperature differences of more than 700 degrees Celsius;

(ii.) said glass ceramic body comprises a plate structure;

(iii.) said glass ceramic body comprises a composition in weight percent, on an oxide basis, of:

| | |
|---|---|
| $LiO_2$ | 3.0 to 4.0 |
| $Na_2O$ | 0 to 1.0 |
| $K_2O$ | 0 to 0.6 |
| S $Na_2O+K_2O$ | 0.2 to 1.0 |
| MgO | 0 to 1.5 |
| CaO | 0 to 0.5 |
| SrO | 0 to 1.0 |
| BaO | 0 to 2.5 |
| S CaO+SrO+BaO | 0.2 to 3.0 |
| ZnO | 1.0 to 2.2 |
| $Al_2O_3$ | more than 19.8 to 23 |
| $SiO_2$ | 66 to 70 |
| $TiO_2$ | 2.0 to 3.0 |
| $ZrO_2$ | 0.5 to 2.0 |
| $P_2O_5$ | 0 to 1.0 | and at least one fining agent comprising: $As_2O_3$, $Sb_2O_3$, $SnO_2$, $CeO_2$ and sulfate compounds and chloride compounds;

(iv.) said glass ceramic body comprises a layer being disposed on said exterior surface and adjacent said second glass ceramic region;
said layer comprising a vitreous layer;

(v.) said glass ceramic body comprises a layer being disposed on said exterior surface and adjacent said second glass ceramic region;
said layer comprising a vitreous layer;
said vitreous layer comprising a substantial content of at least one of: $Na_2O$, $K_2O$, CaO, SrO, and BaO, to protect said second glass ceramic region against acids;

(vi.) said glass ceramic body comprises a layer being disposed on said exterior surface and adjacent said second glass ceramic region;
said layer comprising a vitreous layer;
said vitreous layer has a thickness of 100 to 600 nanometers;

(vii.) said second glass ceramic region, comprising high quartz mixed crystals, has a thickness of from 0.1 to 2.0 micrometers;

(viii.) said keatite mixed crystals comprise crystals having an average grain size of one of: from 0.3 to 2 micrometers, and from 1 to 1.5 micrometers;

(ix.) said glass ceramic body has a coefficient of thermal expansion, between room temperature and 700 degrees Celsius, that is one of: less than 1.3 millionths per degree Kelvin, and less than 1.1 millionths per degree Kelvin; and (x.) said glass ceramic body comprises glass ceramic having a white value in the LAB System of L* greater than 83.

10. The glass ceramic body according to claim 9, comprising all of:

(ai.) coloring impurities in said glass ceramic body are minimized;

(bi.) a content of: $V_2O_5$ less than 15 ppm, $MoO_3$ less than 20 ppm, CoO less than 10 ppm, NiO less than 10 ppm; and (ci.) a total of $V_2O_5+MoO_3+CoO+NiO$ of less than 30 ppm.

11. The glass ceramic body according to claim 9, wherein:
said glass ceramic body comprises a white colored glass ceramic;
said white colored glass ceramic comprises a coloring agent;
said coloring agent comprising a coloring agent being configured to modify the white color of said glass ceramic body;

said coloring agent comprising at least one compound of: V, Cr, Mn, Ce, Fe, Co, Cu, Ni and/or Se—Cl.

12. The glass ceramic body according to claim 11, wherein:
said coloring agent comprises a coloring agent producing a beige colored glass ceramic body;
said coloring agent comprises at least one of: $CeO_2$, $MnO_2$ and/or $Fe_2O_3$.

13. A method of making a smooth-top cooktop, said smooth-top cooktop comprising:
a cooking surface configured to cook food;
at least one heat source configured to heat said cooking surface to thereby cook food;
control apparatus configured and disposed to control said smooth-top cooktop;
said control apparatus being connected to control said at least one heat source and thus to control heat;
said smooth-top cooktop comprising a glass ceramic body;
said cooking surface being disposed adjacent to or comprising a part of said glass ceramic body;
said glass ceramic body comprising:
a crystallized and ceramicized glass;
an interior portion;
an exterior surface;
a first glass ceramic region and a second glass ceramic region;
said first glass ceramic region being disposed within said interior portion of said glass ceramic body;
said second glass ceramic region being disposed between said exterior surface and said first glass ceramic region;
said glass ceramic body comprising glass ceramic continuously from within said first glass ceramic region to within said second glass ceramic region;
said first glass ceramic region comprising, at least predominantly, a first glass ceramic material;
said second glass ceramic region comprising, at least predominantly, a second glass ceramic material;
said first glass ceramic material comprising a chemically different glass ceramic material than said second glass ceramic material;
said smooth-top cooktop comprising at least one of (i.) and (ii.):
(i.) said first glass ceramic region of said glass ceramic body being configured to provide resistance to impact to said second glass ceramic region from cooking utensils being dropped onto said second glass ceramic region of said smooth-top cooktop; and
(ii.) said second glass ceramic region of said glass ceramic body being configured to minimize defects in said exterior surface; and
said surface defects comprising at least one of: fissures, cracks, pits, and pores;
said method comprising the steps of:
providing a glass body;
crystallizing and ceramicizing said glass body and forming said glass ceramic body;
said crystallizing and ceramicizing of said glass body comprising crystallizing and ceramicizing and forming said first glass ceramic region, comprising said first glass ceramic material, in said interior portion of said glass body; and said crystallizing and ceramicizing of said glass body comprising crystallizing and ceramicizing and forming said second glass ceramic region, comprising said second and chemically different glass ceramic material than said first glass ceramic material; and said crystallizing and ceramicizing of said glass body comprising crystallizing and ceramicizing and forming said second glass ceramic region between said first glass ceramic region and said exterior surface;
said crystallizing and ceramicizing forming continuous glass ceramic from within said first glass ceramic region to within said second glass ceramic region.

14. The method of making a smooth-top cooktop according to claim 13, wherein:
said glass ceramic body comprises one of (a.) and (b.):
(a.) translucent glass ceramic; and
(b.) opaque glass ceramic; and said glass ceramic body having:
(A.) a light transmissivity in the visible range of 0.5 to 10% for a 4 millimeters specimen thickness;
(B.) an impact strength of more than 18 centimeters drop ball impact strength on average, tested with a 200 grams steel ball in a ball drop test;
(C.) an ability to withstand a temperature of more than 650 degrees Celsius;
(D.) keatite mixed crystals as the predominant crystal phase of said first glass ceramic material of said glass ceramic body;
(E.) high quartz mixed crystals as the predominant crystal phase of said second glass ceramic material of said glass ceramic body;
(F.) a coefficient of thermal expansion of said high quartz mixed crystals which is less than that of said keatite mixed crystals, to minimize surface defects of said exterior surface that reduce strength; and
(G.) a $SiO_2$ content of said high quartz mixed crystals that is less than 80 weight %; and a minimized transformation of said high quartz mixed crystals into low quartz crystals upon cooling of said glass ceramic body to room temperature to minimize cracks in said exterior surface; said method comprising the steps of:
exposing said glass ceramic body to heat and traversing the temperature range of nucleation of nucleus crystals containing Zr/Ti from 650 degrees Celsius to 760 degrees Celsius at high heating rates of more than 7 K/min;
crystallizing high quartz mixed crystal phase at a temperature from 760 degrees Celsius to 850 degrees Celsius; and
maintaining a temperature in the range between 650 degrees Celsius to 850 degrees Celsius for less than 60 minutes.

15. The method according to claim 14, wherein:
said crystallized and ceramicized glass having the following composition, in weight percent, on an oxide basis:

| | |
|---|---|
| $LiO_2$ | 3.0 to 4.0 |
| $Na_2O$ | 0 to 1.0 |
| $K_2O$ | 0 to 0.6 |
| S $Na_2O+K_2O$ | 0.2 to 1.0 |
| MgO | 0 to 1.5 |
| CaO | 0 to 0.5 |
| SrO | 0 to 1.0 |

-continued

| | |
|---|---|
| BaO | 0 to 2.5 |
| S CaO+SrO+BaO | 0.2 to 3.0 |
| ZnO | 1.0 to 2.2 |
| $Al_2O_3$ | more than 19.8 to 23 |
| $SiO_2$ | 66 to 70 |
| $TiO_2$ | 2.0 to 3.0 |
| $ZrO_2$ | 0.5 to 2.0 |
| $P_2O_5$ | 0 to 1.0 | and at least one fining agent comprising: $As_2O_3$, $Sb_2O_3$, $SnO_2$, $CeO_2$ and sulfate compounds and chloride compounds.

16. The method according to claim 15, comprising at least one of:
   (Ai.) performing transformation of the high quartz mixed crystal phase into the keatite mixed crystal phase in the interior of said glass ceramic body at maximum temperatures of 1000 to 1100 degrees Celsius; and
   selecting a heating rate and a hold time at the maximum temperature to minimize formation of low quartz mixed crystals upon cooling to room temperature;
   (Bi.) ceramicizing said glass body at a temperature above 1100 degrees Celsius, and forming an opaque glass ceramic body having a light transmissivity in the visible range of <0.5% for a specimen thickness of 4 millimeters; and
   (Ci.) ceramicizing said glass body at a temperature lower than 1000 degrees Celsius and forming a transparent glass ceramic body having a light transmission in the visible range of more than 80% for a specimen thickness of 4 mm, and forming essentially high quartz mixed crystals as predominant crystal phase.

17. The method according to claim 14, comprising at least one of:
   (Ai.) performing transformation of the high quartz mixed crystal phase into the keatite mixed crystal phase in the interior of said glass ceramic body at maximum temperatures of 1000 to 1100° C.; and
   selecting a heating rate and a hold time at the maximum temperature to minimize formation of low quartz mixed crystals upon cooling to room temperature;
   (Bi.) ceramicizing said glass body at a temperature above 1100 degrees Celsius, and forming an opaque glass ceramic body having a light transmissivity in the visible range of <0.5% for a specimen thickness of 4 millimeters; and
   (Ci.) ceramicizing said glass body at a temperature lower than 1000 degrees Celsius and forming a transparent glass ceramic body having a light transmission in the visible range of more than 80% for a specimen thickness of 4 mm, and forming essentially high quartz mixed crystals as predominant crystal phase.

18. A method of making a glass ceramic body, such as a smooth-top cooktop, a stove with a smooth-top cooktop, a glass ceramic providing fire protection of a door or a window for a building, culinary ware, ovenware, direct oven-to-table cookware, and cookware, a glass ceramic pane to serve as a fire screen such as in a fireplace, or as a window for a self-cleaning oven, said method comprising the steps of:
   providing a glass body; said glass body comprising an interior portion and an exterior surface;
   crystallizing and ceramicizing said glass body and forming a first glass ceramic region, comprising a first glass ceramic material, in said interior portion of said glass body; and crystallizing and ceramicizing said glass body and forming a second glass ceramic region, comprising a second and chemically different glass ceramic material than said first glass ceramic material; and crystallizing and ceramicizing said glass body and forming said second glass ceramic region, between said first glass ceramic region and said exterior surface, to minimize defects in said exterior surface;
   said first glass ceramic region being configured to provide resistance to impact to said second glass ceramic region; and
   said crystallizing and ceramicizing forming continuous glass ceramic from within said first glass ceramic region to within said second glass ceramic region, to form said glass ceramic body.

19. The method according to claim 18, wherein:
said glass ceramic body comprises one of (a.) and (b.):
   (a.) translucent glass ceramic; and
   (b.) opaque glass ceramic; said glass ceramic body having:
      (A.) a light transmissivity in the visible range of 0.5 to 10% for a 4 millimeters specimen thickness;
      (B.) an ability to withstand a temperature of more than 650 degrees Celsius;
      (C.) keatite mixed crystals as the predominant crystal phase of said first glass ceramic material of said glass ceramic body;
      (D.) high quartz mixed crystals as the predominant crystal phase of said second glass ceramic material of said glass ceramic body;
      (E.) a coefficient of thermal expansion of said high quartz mixed crystals which is less than that of said keatite mixed crystals, to minimize surface defects of said exterior surface that reduce strength; and
      (F.) a $SiO_2$ content of said high quartz mixed crystals that is less than 80 weight %; and a minimized transformation of said high quartz mixed crystals into low quartz crystals upon cooling of said glass ceramic body to room temperature to minimize cracks in said exterior surface; said method comprising the steps of:
         exposing said glass ceramic body to heat and traversing the temperature range of nucleation of nucleus crystals containing Zr/Ti from 650 degrees Celsius to 760 degrees Celsius at high heating rates of more than 7 K/min;
         crystallizing high quartz mixed crystal phase at a temperature from 760 degrees Celsius to 850 degrees Celsius; and
         maintaining a temperature in the range between 650 degrees Celsius to 850 degrees Celsius for less than 60 minutes.

20. The method according to claim 19, wherein: said crystallized and ceramicized glass having the following composition, in weight percent, on an oxide basis:

| | |
|---|---|
| $LiO_2$ | 3.0 to 4.0 |
| $Na_2O$ | 0 to 1.0 |
| $K_2O$ | 0 to 0.6 |
| S $Na_2O+K_2O$ | 0.2 to 1.0 |
| MgO | 0 to 1.5 |
| CaO | 0 to 0.5 |
| SrO | 0 to 1.0 |

| | -continued |
|---|---|
| BaO | 0 to 2.5 |
| S CaO+SrO+BaO | 0.2 to 3.0 |
| ZnO | 1.0 to 2.2 |
| $Al_2O_3$ | more than 19.8 to 23 |
| $SiO_2$ | 66 to 70 |
| $TiO_2$ | 2.0 to 3.0 |
| $ZrO_2$ | 0.5 to 2.0 |
| $P_2O_5$ | 0 to 1.0 | and at least one fining agent comprising: $As_2O_3$, $Sb_2O_3$, $SnO_2$, $CeO_2$ and sulfate compounds and chloride compounds.

21. The method according to claim 19, comprising at least one of:
(Ai.) performing transformation of the high quartz mixed crystal phase into the keatite mixed crystal phase in the interior of said glass ceramic body at maximum temperatures of 1000 to 1100 degrees Celsius; and
selecting a heating rate and a hold time at the maximum temperature to minimize formation of low quartz mixed crystals upon cooling to room temperature;
(Bi.) ceramicizing said glass body at a temperature above 1100 degrees Celsius, and forming an opaque glass ceramic body having a light transmissivity in the visible range of <0.5% for a specimen thickness of 4 millimeters; and
(Ci.) ceramicizing said glass body at a temperature lower than 1000 degrees Celsius and forming a transparent glass ceramic body having a light transmission in the visible range of more than 80% for a specimen thickness of 4 mm, and forming essentially high quartz mixed crystals as predominant crystal phase.

22. The method according to claim 20, comprising at least one of:
(Ai.) performing transformation of the high quartz mixed crystal phase into the keatite mixed crystal phase in the interior of said glass ceramic body at maximum temperatures of 1000 to 1100 degrees Celsius; and
selecting a heating rate and a hold time at the maximum temperature to minimize formation of low quartz mixed crystals upon cooling to room temperature;
(Bi.) ceramicizing said glass body at a temperature above 1100 degrees Celsius, and forming an opaque glass ceramic body having a light transmissivity in the visible range of <0.5% for a specimen thickness of 4 millimeters; and
(Ci.) ceramicizing said glass body at a temperature lower than 1000 degrees Celsius and forming a transparent glass ceramic body having a light transmission in the visible range of more than 80% for a specimen thickness of 4 mm, and forming essentially high quartz mixed crystals as predominant crystal phase.

* * * * *

UNITED STATES PATENT AND TRADEMARK OFFICE
CERTIFICATE OF CORRECTION

PATENT NO.      : 6,515,263 B2                                              Page 1 of 1
DATED           : February 4, 2003
INVENTOR(S)     : Ina Mitra et al.

It is certified that error appears in the above-identified patent and that said Letters Patent is hereby corrected as shown below:

Column 22,
Line 48, after the second occurrence of "ceramic", delete "(101)" and insert
-- 100 --.
Line 49, before "which", delete "(102)" and insert -- 102 --.
Line 50, after "layer", delete "(101)" and insert -- 101 --.
Line 51, after "contiguous", delete "(103)" and insert -- at 103 --.

Signed and Sealed this

Sixth Day of May, 2003

JAMES E. ROGAN
*Director of the United States Patent and Trademark Office*